US010924639B2

(12) United States Patent
Smithwick et al.

(10) Patent No.: US 10,924,639 B2
(45) Date of Patent: Feb. 16, 2021

(54) SYSTEM AND METHOD FOR POLARIZATION AND WAVELENGTH GATED TRANSPARENT DISPLAYS

(71) Applicant: Disney Enterprises, Inc., Burbank, CA (US)

(72) Inventors: Quinn Smithwick, Burbank, CA (US); Samuel J. Reisner, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 0 days.

(21) Appl. No.: 16/424,932

(22) Filed: May 29, 2019

(65) Prior Publication Data

US 2020/0382681 A1    Dec. 3, 2020

(51) Int. Cl.
| | |
|---|---|
| H04N 5/222 | (2006.01) |
| G03B 21/604 | (2014.01) |
| H04N 21/81 | (2011.01) |
| H04N 9/31 | (2006.01) |
| G06F 3/01 | (2006.01) |

(52) U.S. Cl.
CPC ......... *H04N 5/2222* (2013.01); *G03B 21/604* (2013.01); *G06F 3/017* (2013.01); *H04N 9/3141* (2013.01); *H04N 9/3179* (2013.01); *H04N 21/8146* (2013.01)

(58) Field of Classification Search
CPC ........... H04N 7/147; H04N 7/15; H04N 5/247
See application file for complete search history.

(56) References Cited

U.S. PATENT DOCUMENTS

| | | | |
|---|---|---|---|
| 2005/0146880 A1* | 7/2005 | Hibi ...................... | G03B 21/62 362/296.06 |
| 2015/0227035 A1* | 8/2015 | Joseph ................... | G03B 15/03 353/20 |

* cited by examiner

*Primary Examiner* — Samira Monshi
(74) *Attorney, Agent, or Firm* — McCormick, Paulding & Huber PLLC

(57) ABSTRACT

A transparent display system is provided where broadcast talent (or presenter) can see interactive content, tool palettes, prompts (and the like) as well as their own sketches and annotations, but a viewing audience sees only the broadcast talent and content intended for the viewing audience with the talent's annotation thereof. A transparent scattering screen together with optical filtering or gating of a first optical property of the light (e.g., polarization-based or wavelength-based) is used such that the first property of the light is projected onto the screen so the talent can see the projection, and a camera-side filter blocks the first property of the light so it is not seen by the camera. Simultaneously, a broadcast talent (or presenter) is illuminated by light having properties other than the first property, which allows the talent image to pass through the screen and the camera-side filter allowing the talent to be seen by camera. In some embodiments, a transparent "two-sided" display screen allows people on opposite sides of the screen to see each other, as well as independent 2D or 3D content from each person's side of the screen.

39 Claims, 12 Drawing Sheets

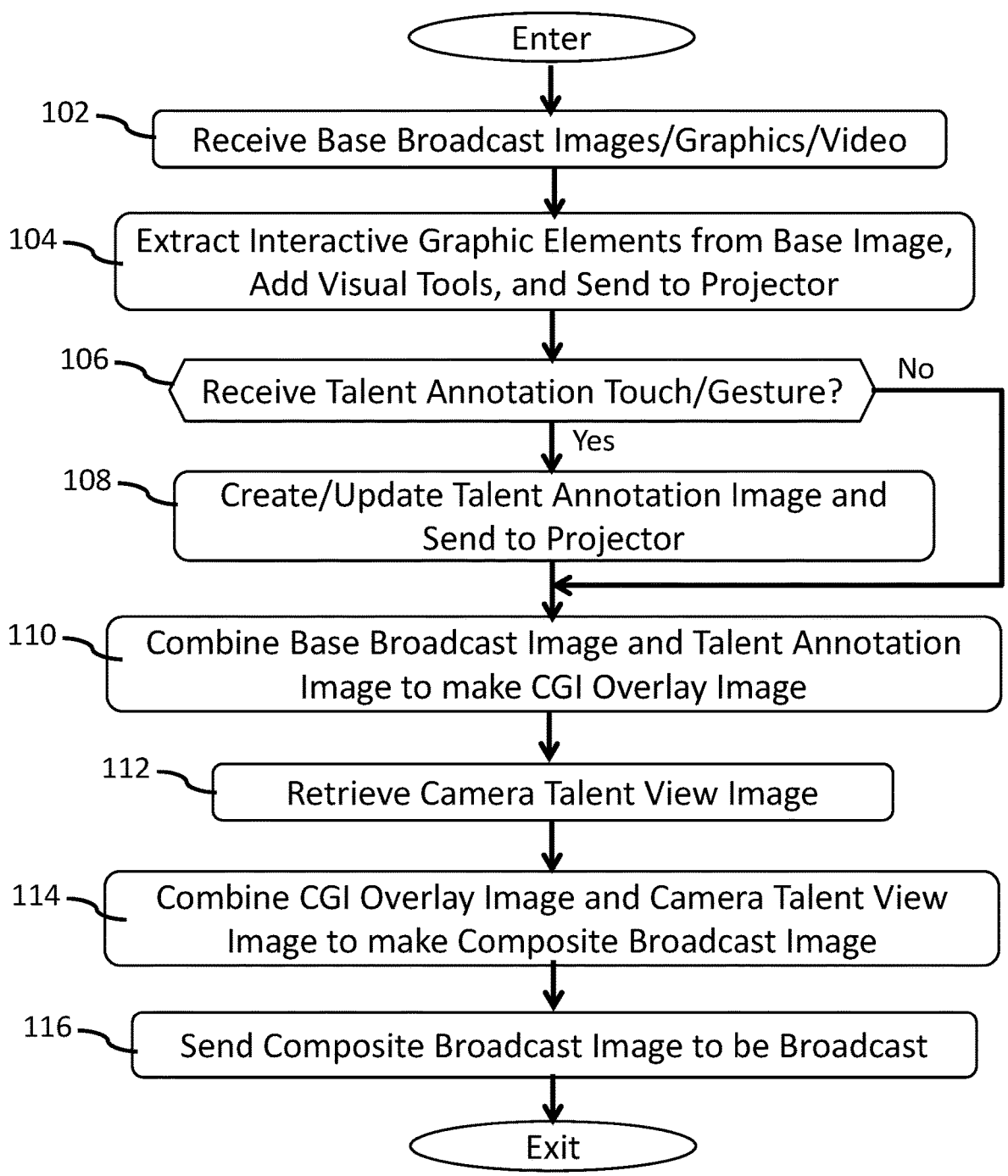

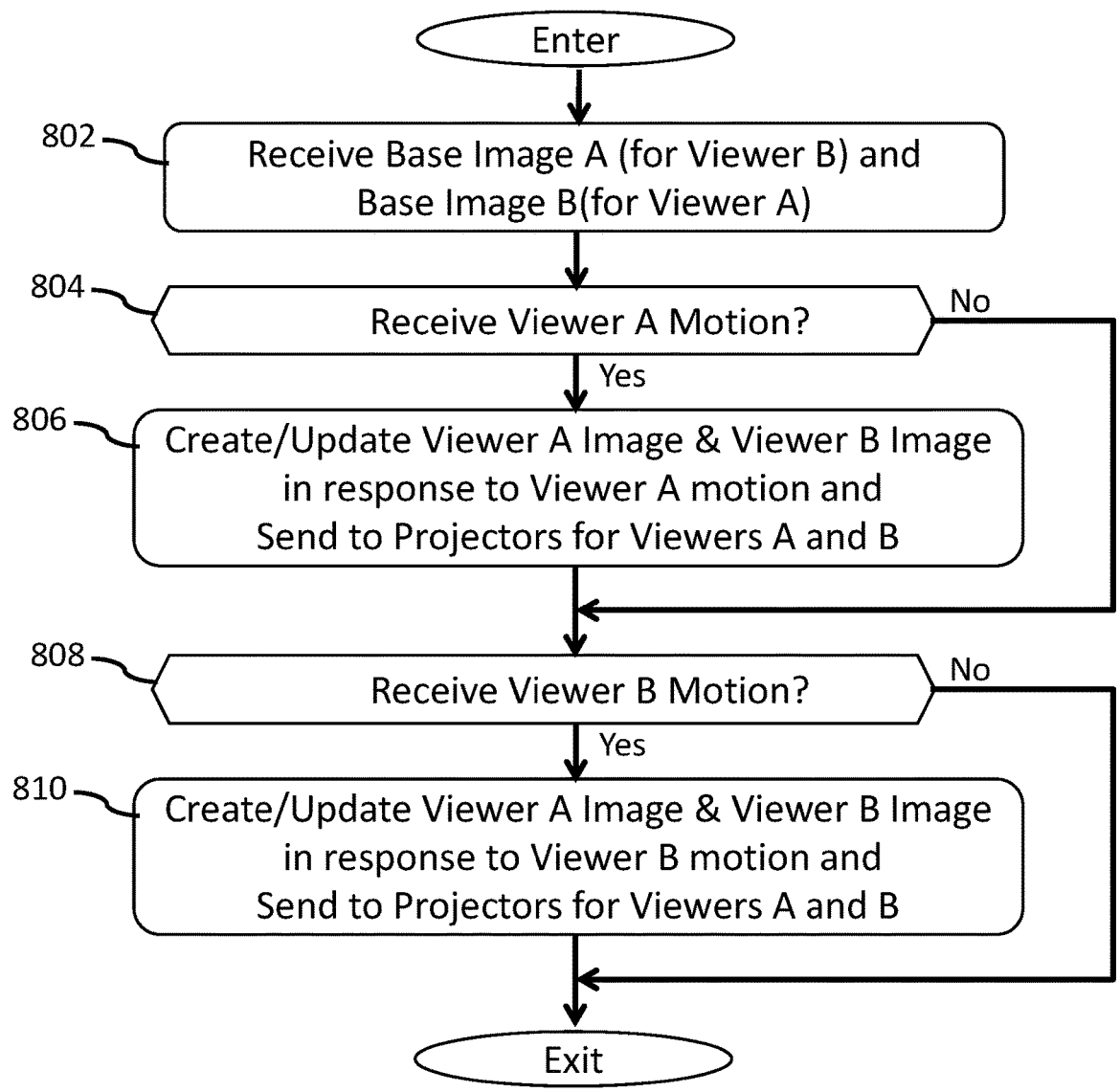

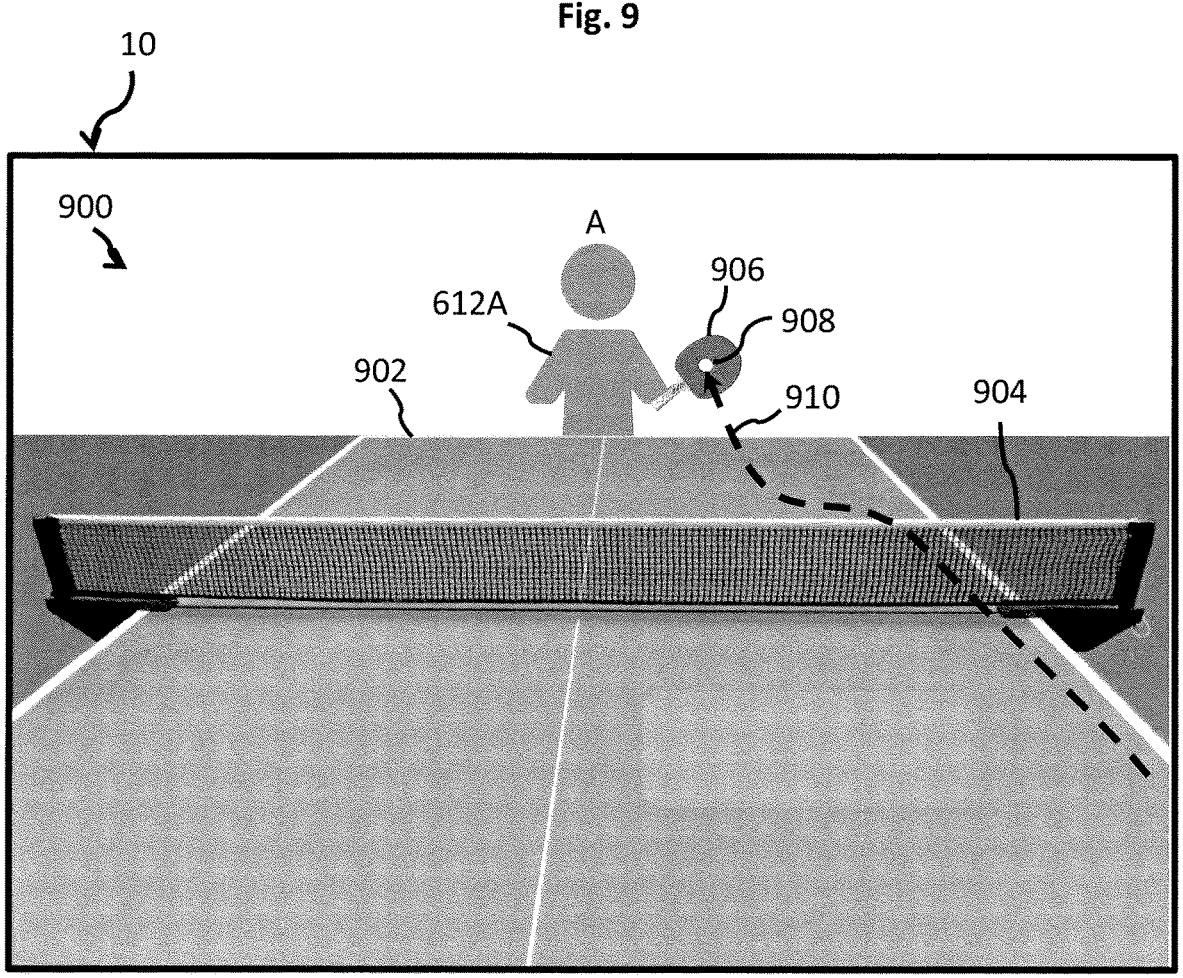

SYSTEM AND METHOD FOR POLARIZATION AND WAVELENGTH GATED TRANSPARENT DISPLAYS

BACKGROUND

During sports analysis and talk-show television and video productions, the on-screen (or broadcast) talent needs to see and interact with video, pictures, and information on a shared screen with the viewing audience, but needs to have his/her face visible and make eye-contact with audience. Touch-screen monitors or green-screen backgrounds often have the information behind the broadcast talent and the talent facing away from the cameras and audience. Also, important content may be blocked by the talent and the audience may just see the back or profile of the talent. Furthermore, it is difficult for talent that is not familiar with green-screen technology to coordinate their actions with computer generated content displayed on off-screen monitors.

Accordingly, it would be desirable to have an optical display method and system that overcomes these issues and allows the broadcast talent to interact with the viewers and content more naturally in view of the aforementioned requirements and challenges.

BRIEF DESCRIPTION OF THE DRAWINGS

FIG. 1B is a flow diagram of an embodiment of a Rendering Engine of FIG. 1A, in accordance with embodiments of the present disclosure.

FIG. 8 is a flow diagram of an embodiment of a Rendering Engine for a two-sided display system, in accordance with embodiments of the present disclosure.

FIG. 9 is a screen illustration of an image of an interactive game viewed from one side of a screen of a two-sided display system, in accordance with embodiments of the present disclosure.

DETAILED DESCRIPTION

Figure 1A:
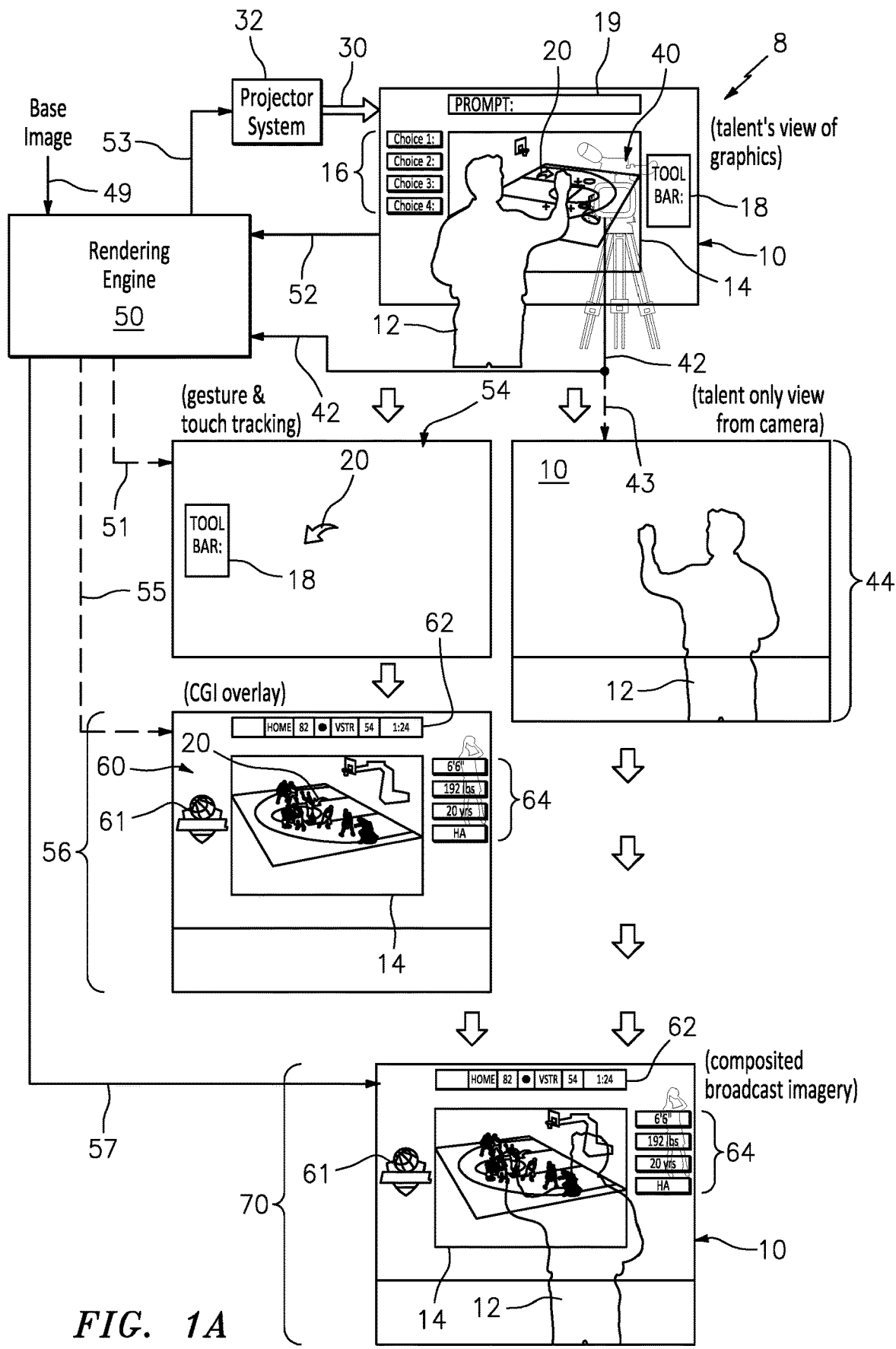
FIG. 1A is a top-level block diagram of components of a system for polarization and wavelength-gated transparent displays, in accordance with embodiments of the present disclosure.

As discussed in more detail below, in some embodiments, the present disclosure is directed to a transparent "one-sided" display/screen system where the on-screen or broadcast talent or presenter can see interactive content, tool palettes, prompts (and the like) as well as their own sketches and annotations, but the camera/audience will see the broadcast talent, but will not view certain other elements viewable to the broadcast talent. With touch, gesture or tracking information of the broadcast talent's performance, relevant high resolution, high-quality computer generated (CG) graphics, 3D renderings, and HD video and images can be synchronized and composited (or superimposed) over the camera feed of just the talent's performance, resulting in production-quality video commentary of the broadcast talent with overlays.

Some embodiments of the present disclosure provide a transparent "two-sided" display/screen system, which allows at least one person on each side of the display/screen to see each other, as well as independent 2D or 3D content from each person's side of the screen. Such screens could also be used in advertising billboards, windows, and information signage, as well as interactive games, and the like.

If solely a standard transparent screen (e.g., a transparent OLED TV) between the broadcast talent (or presenter) and the camera were used, it would allow content to be presented to the viewing audience without occlusion and allow some eye-contact between the talent and the viewing audience; however, the content viewed by the talent would also be visible to the camera (and, thus, the viewing TV audience). Such an arrangement also presents visual imaging or interpretation problems with content being backwards for either the talent or the viewing TV audience. If the screen were flipped horizontally to obviate such visual imaging problems, it would also flip the appearance of the talent, which, in many cases, may make the talent look unfamiliar (e.g., hair parts on the wrong side) or change their trademark or distinctive look.

Some embodiments of the present disclosure may use a transparent scattering screen with specially designed optical filtering or gating of an optical property (e.g., polarization-based (linear or circular) or wavelength/color-based) of a source light (or image) and a reflected light (or image), which leverages the benefits of a standard transparent display while avoiding its drawbacks or problems. In particular, for polarization and wavelength gating, a principle of some embodiments of the present disclosure is to project a first optical property (or state) of the light (e.g., using a projector filter located at the projector or near the screen) onto a transparent scattering screen, so the talent (located on one side of the screen) can see the projected image, then use a camera-side filter (located over the camera lens or near the screen) to block the reflected light, e.g., having the first optical property (or state) of the light so it is not seen by the camera. Simultaneously, the broadcast talent (or presenter) is illuminated by studio/stage light (or ambient light) having optical properties other than the first optical property (or having multiple optical properties or states); thus, much of the light (i.e., the talent image) will pass through the camera filter allowing the talent to be seen by camera. In some embodiments, the camera/projector filters may be consolidated at the screen (or screen assembly).

Accordingly, the present disclosure uses certain beneficial features of standard transparent displays while avoiding non-beneficial ones, and also enables other more advanced interactive arrangements, such as multi-person 2-way screen interaction, 3D imaging, and others.

Referring to FIG. 1A, an overall view of an embodiment of a gated, one-sided transparent display system 8 of the present disclosure is shown. In particular, in some embodiments, the display system 8 includes a transparent display screen 10 (discussed hereinafter), a viewer 12, e.g., a talent, located on one side (e.g., Side B or back side (in FIG. 1A) or talent side or right side (in the side-views shown herein)) of the transparent screen 10, and a camera system 40 (or camera or viewer or viewing system) and a projector system 32 (or projection system or projector) both located on an opposite side (e.g., Side A or front side (in FIG. 1A) or camera side or left side (in the side-views shown herein)) of the transparent screen 10 (also see FIG. 2A). Other labels may be used for each side of the screen 10 if desired. The display system 8 is configured to allow the talent 12 or, generally, a "viewer" (e.g., an individual performing for a viewing TV audience, such as an analyst, broadcaster, presenter, or the like) to view and interact (if desired) with a talent graphics image (or signal) 30, also referred to herein as the optical projection image (or signal) or graphics image or GUI image 30, which may include various graphical user interface (GUI) elements, such as interactive graphics or content 14 (e.g., players on a court/field), tool palettes, such as user choices 16 and tool bar options 18, user/talent prompts 19 (e.g., prompts for the talent from a producer, director, other talent in the studio), and the like, as well as the talent's 12 sketches and annotations 20 (discussed more hereinafter with FIG. 1C). Other interactive/GUI features of the image 30 may be displayed or provided if desired. While annotation-type interaction with the talent graphics by the talent 12 may be used if desired, such annotation-type interaction by the talent 12 is optional. For example, in some embodiments, the talent 12 may provide only commentary (verbal or hand/body gestures) on or near the talent graphics being viewed by the talent 12 and not actually annotate on the talent graphics image 14.

Also, in addition to the talent 12 seeing the projection image 30 on the transparent screen 10, the talent 12 also sees through the transparent screen 10 to things or images located on the other side of the screen (e.g., on Side A), as shown in the talent's view of the screen 10 (discussed more hereinafter). In particular, in FIG. 1A, the talent 12 sees the camera system 40 through the screen 10.

The graphics image 30 may be received from the projector system 32, which projects the image 30 onto the screen 10, and which may include a projector (discussed herein) and optical components to provide the graphics image 30 having the desired optical signal characteristics or gating (discussed hereinafter). The camera system 40 may contain a video camera (discussed herein) and optical components to perform the desired optical signal filtering or gating (discussed hereinafter) to view the talent 12 through the screen 10, but omit the talent graphics image 30 (or the graphic elements 14, 16, 18, 19) that are seen by the talent 12 from the image input to the camera. The camera system 40 provides a digital camera optical signal (or image) on a line 42, indicative of the image(s) seen by the camera system 40, which includes the talent 12 located behind the transparent screen 10 and any graphics images displayed on (or displayed by) the screen 10 that are seen by the camera 40 (none in this case), collectively shown (for illustrative purposes) as a digital camera image 44, shown by a dashed line 43. The digital camera optical signal 42 is provided to a rendering engine 50, which processes the image for use in the system (discussed hereinafter).

The transparent screen 10 may also have touch or gesture (movement or voice or sound based) tracking sensors built into the screen 10 or external thereto (not shown), which may provide an annotation tracking signal on a line 52 to the rendering engine 50, indicative of the talent's 12 annotations (or telestrations) 20 made on the interactive graphics element 14 seen on the screen 10 by the talent 12 (or presenter). In particular, the touch or gesture may be measured by the tracking sensors and the tracking signal is recognized and translated by the rendering engine 50 to be interpreted as a command. These commands (described more hereinafter) may be used to interact with the graphics on the screen 10 to create the visual effects desired by the talent 12. The tracking sensors may also map the location (or coordinates) of the gesture or touches to know where in the projection image 30 (and the viewing audience image) to show the annotations (or telestrations) 20.

The rendering engine 50 (or RE) receives input signals (described above) on the lines 42, 52, and an input base image or video on a line 49, and provides a digital content optical signal (or digital content signal) on a line 53 to the projector system 32, indicative of the talent graphics output image (or projection image) 30 projected on the screen 10 by the projector system 32 to be viewed by a talent 12. The rendering engine 50 also provides a composited broadcast signal 70, which is provided to the viewing TV audience (described hereinafter). The rendering engine 50 contains the necessary hardware, software, firmware, and the like, needed to perform the functions described herein.

The rendering engine 50 receives the touch or gesture data on the line 52 from the screen 10 (or corresponding sensors, hardware, firmware, or software) and creates a digitized input graphic image 54 shown by a dashed line 51 having digital pixels or location coordinates which map to the transparent screen 10. The digital image 54 is indicative of the options (e.g., tool bar 18) selected by the talent 12 and the detected talent movements, which are mapped onto the image 54, such as the talent annotation graphic arrow 20. The rendering engine 50 then combines (or mergers or adds) the talent annotation graphic 20 (or the entire image 54) to the digital image signal on the line 53 provided to the projector system 32 using the mapping information to create an updated digital content signal 53. The resultant combined image (indicative of the updated digital content signal) is then displayed on the screen 10 for the talent 12 to view, as shown by the arrow 20 in the graphic element 14.

In addition, the rendering engine 50 creates a Computer-Generated Graphic Imagery (or CGI) digital overlay 56, shown by a dashed line 55. The digital overlay 56 is indicative of the imagery desired to be shown to the viewing audience, which may include an upper portion 60 corresponding to the transparent screen 10, having certain portions or graphic elements that are also displayed to the talent 12, e.g., the players/court graphic element (or talent graphics image) 14, and also includes the talent's annotation graphic 20 (arrow) derived from the digitized input graphic image 54 (discussed above). The overlay 56 may also include other graphics or images not displayed to the talent 12, such as a game or tournament logo 61, game clock and score banner 62, stats and graphic for a given player 64, or other graphics or information. In some embodiments, the talent annotation graphic arrow 20 may be fed to both the projector image 30 and the digital overlay image 50.

The digital overlay 56 (without the talent annotation 20), may be referred to as the "base" image on the line 49, which is provided to the rendering engine 50 in real-time, from an external digital source, such as a computer or server controlled by a show producer, or other source that determines the base image to be shown to the viewing audience. Any other type of overlay or combination or integration or compilation of images, graphics or video may be used if desired.

The rendering engine 50 combines the digital overlay image 56 with the digital camera image 44 (talent only view from the camera system 40) to create the composited broadcast signal 70, shown by a line 57, which is a digital output signal (or image or video) provided to a viewing audience.

Accordingly, with the transparent one-sided display screen 10, the broadcast talent 12 can see interactive content 14, tool palettes 16, 18, prompts 19, and the like, as well as the talent's 12 own sketches and annotations 20, but the camera system 40 (and viewing audience) sees only the talent image 44. In particular, with talent touch, gesture or tracking input information on the line 52 added to the "Base" image, the rendering engine 50 creates the resulting digital CGI overlay image 56, which may include relevant high resolution high-quality computer-generated imagery (CGI) graphics, such as HD video and images, including 3D renderings. The resultant CGI overlay may then be synchronized, mapped and composited (or superimposed) over the camera feed image 44 (of just the talent's audio/visual "performance"), resulting in production quality video commentary with digital overlays, shown as the image 70.

Referring to FIG. 1B, a flow diagram 100 illustrates one embodiment of a process or logic for implementing the Rendering Engine Logic 50, which may be implemented in hardware, software, or firmware, or the like. The process/logic 100 begins at block 102 by receiving a "base" or underlying broadcast image, graphics or video desired to be broadcast to the viewing audience. For example, using the images of FIG. 1A, the base image may be the graphic elements 14, 61, 62, 64, of the image 56, without the annotation arrow 20. Next, at block 104, the logic 100 extracts interactive graphic elements (e.g., interactive graphic element 14) from the Base image and adds graphics for visual tools for talent to use (e.g., talent graphic tools 16, 18, 19) and sends the collection of talent graphics 14, 16, 18, 19 from the base image to the projector system 32 for display on the screen 10 to be viewed by the talent 12. The graphics items to be displayed to the talent 12 on the screen 10 may be predetermined and flagged digitally with a code or label such that the rendering logic 50 may identify the items from the rest of the image data and extract the desired talent graphics to be displayed to the talent 12.

Next, block 106 determines if data has been received that is indicative of talent annotation activity, e.g., screen touch or hand gesture, detected directly by the screen 10 (e.g., touch screen), or by sensors (in the screen or separate therefrom) which identify hand motion (or other gesture) of the talent 12, which indicate a particular annotation action is desired to be illustrated on the projected image 30. If touch/gesture data has been received, a block 108 determines the type of annotation action and creates or updates the talent annotation image 14 to include the talent annotation, e.g., the arrow 20 (FIG. 1A). If the result of block 106 is NO, or after performing block 108, the logic proceeds to block 110 which combines the "base" image with the latest version of the talent annotation image to make the CGI Overlay Image.

Next, a block 112 retrieves the Camera Talent View image, i.e., the camera's view of the screen, e.g., the image 44 (FIG. 1A), which would include the image of the talent 12 as viewed by the camera seeing the talent 12 through the transparent screen 10 and no images projected on the screen for the talent 12 to view (as discussed hereinafter). Next, a block 114 combines the CGI Overlay Image and Camera Talent View image to create the digital Composite Broadcast Image 70 (FIG. 1A). Next, block 116 sends (or provides) the digital Composite Broadcast Image 70 to the appropriate broadcast server or distribution network to be broadcast, streamed, or otherwise distributed or provided, to the viewing audience. Then, the logic exits.

Figure 1C:
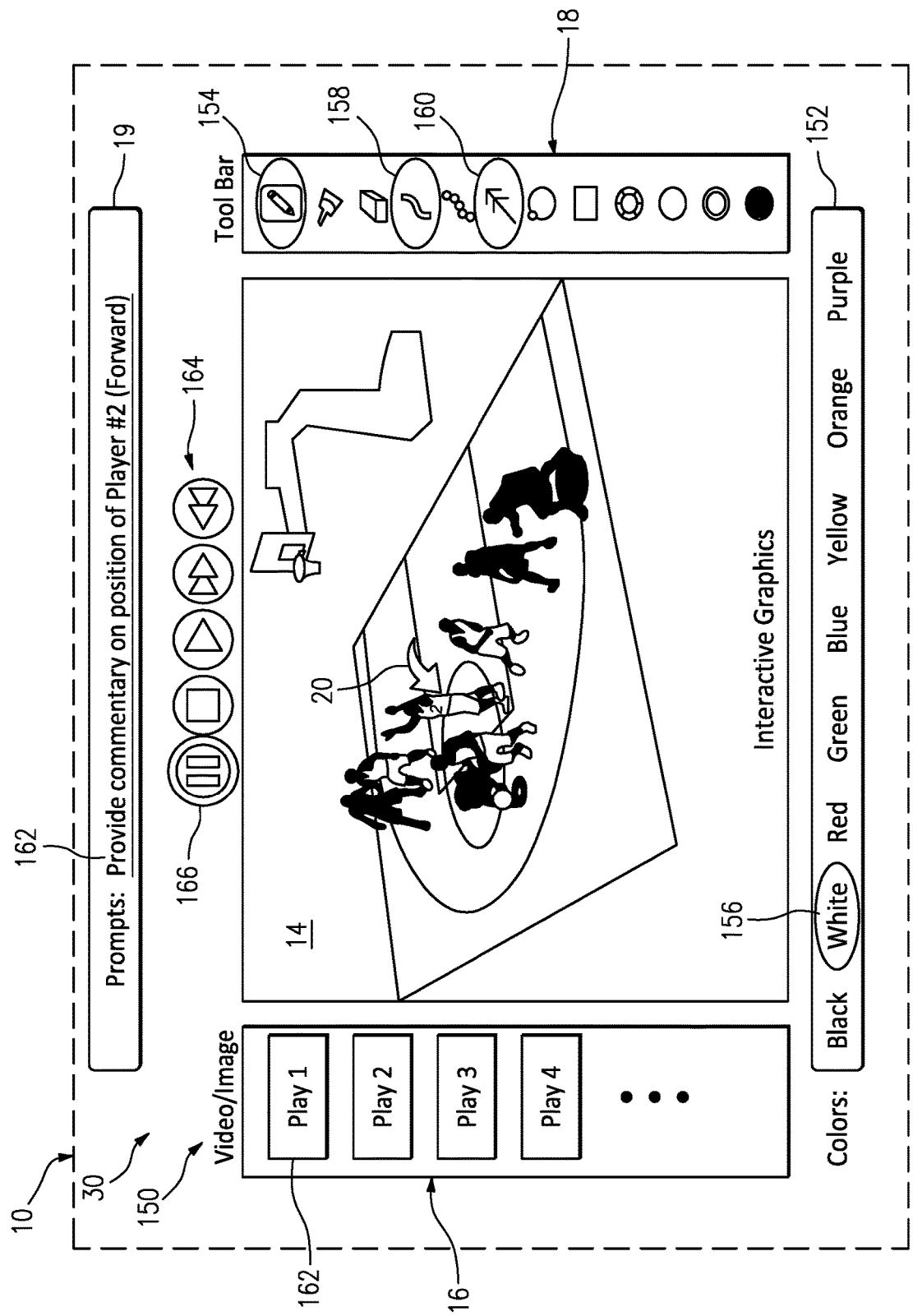
FIG. 1C is a screen illustration of an embodiment of a graphical user interface (GUI) as viewed by a talent (or presenter) in FIG. 1A, in accordance with embodiments of the present disclosure.

Referring to FIG. 1C, a screen illustration of an embodiment of the talent graphics image 30, or projection image or a talent graphical user interface (GUI) or talent GUI 30, which are projected on the transparent screen 10 (FIG. 1) and viewed by the talent 12. The talent GUI may include various graphic elements or talent GUI elements 150, such as the interactive graphics or content 14 (e.g., players on a court/field), and various interactive GUI visual tools, such as a "Video/Image" choice section 16, showing current video or image selection of the user/talent 12, "Tool Bar" 18, "Colors" 152, video player buttons 164 (pause, stop, play, forward, and reverse, listed as shown from left), and user/talent "Prompts" 19 (e.g., prompts for the talent from a producer, director, other talent in the studio), and the like, as well as the talent's 12 sketches and annotations 20, as discussed herein above. Other display or annotation features may be provided in the talent GUI 30 if desired.

In particular, for the talent 12 (FIG. 1A) to insert the arrow 20 on the GUI 30, the talent 12 would first touch the GUI screen 10 on the Play 1 button 162, which illuminates the Play 1 button 162 and selects the play to display on the interactive portion 14 of the screen 10. Then, the talent 12 selects a Pause button which causes a thick circle 166 to appear around the Pause button and pauses the play where the talent 12 wants to annotate. Next, the talent 12 touches a draw icon (pen) which causes a circle 154 to appear around the Pen icon in the Tool Bar 18 and the word "Pen" to be displayed in the Status section 16. Next, the talent 12 may touch the GUI screen on a White color icon which will cause a circle 156 to appear in the color selection area 152 around the word White (or the color white if so provided) and the word "White" to appear in the Status section 16. Next, the talent 12 may touch the GUI screen on an Arrow icon which will cause a circle 160 to appear around the Arrow icon in the Tool Bar 18 and the word "Arrow" to appear in the Status section 16. Finally, the talent 12 would touch the screen 10 at the location desired to place the arrow 20, as shown on the GUI 30. Instead of touching the screen 10 to perform selections on the screen 10, the talent may gesture or point toward the screen while a tracking system tracks and interprets the talent's movement, or use voice commands any other approach to cause the screen 10 to select the desired actions of the talent 12.

In addition, one reason for the talent 12 drawing the arrow 20 may come from a "Prompt" comment 162, e.g., "Provide commentary on position of Player #2 (Forward)", provided by another commentator/talent or the show producer or director or other input source, indicating they would like the talent 12 to discuss (and possibly annotate) the talent's thoughts about the position of Player #2 in the basketball play image 14 shown to the talent 12. In that case, the Prompt data 162 (e.g., sentence or phrase) may be entered into a computer from the input source person and the prompt data 162 provided in the prompt field 19 or specially flagged text in the "Base" image provided to the Rendering Engine 50, which will identify and extract the Prompt data 162 (e.g., at block 104 of the Rendering Engine Logic 100, FIG. 1B) and include the Prompt data 162 in the prompt field 19 of the talent graphics image 53 (FIG. 1) sent to the projector system 32 to be included in the image 30 for the talent 12 to see.

Figure 2A:
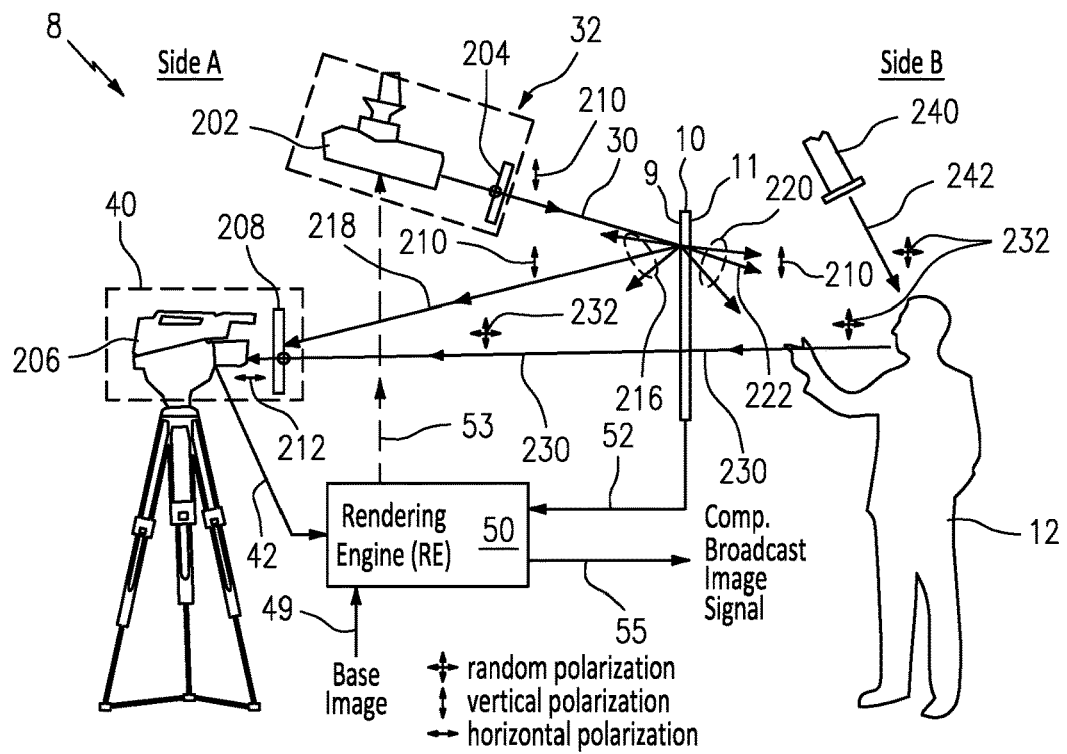
FIG. 2A is a block diagram of optical components of an embodiment of the system of FIG. 1A using linear polarization gating, showing a side view of a screen and propagating light, in accordance with embodiments of the present disclosure.
Figure 2B:
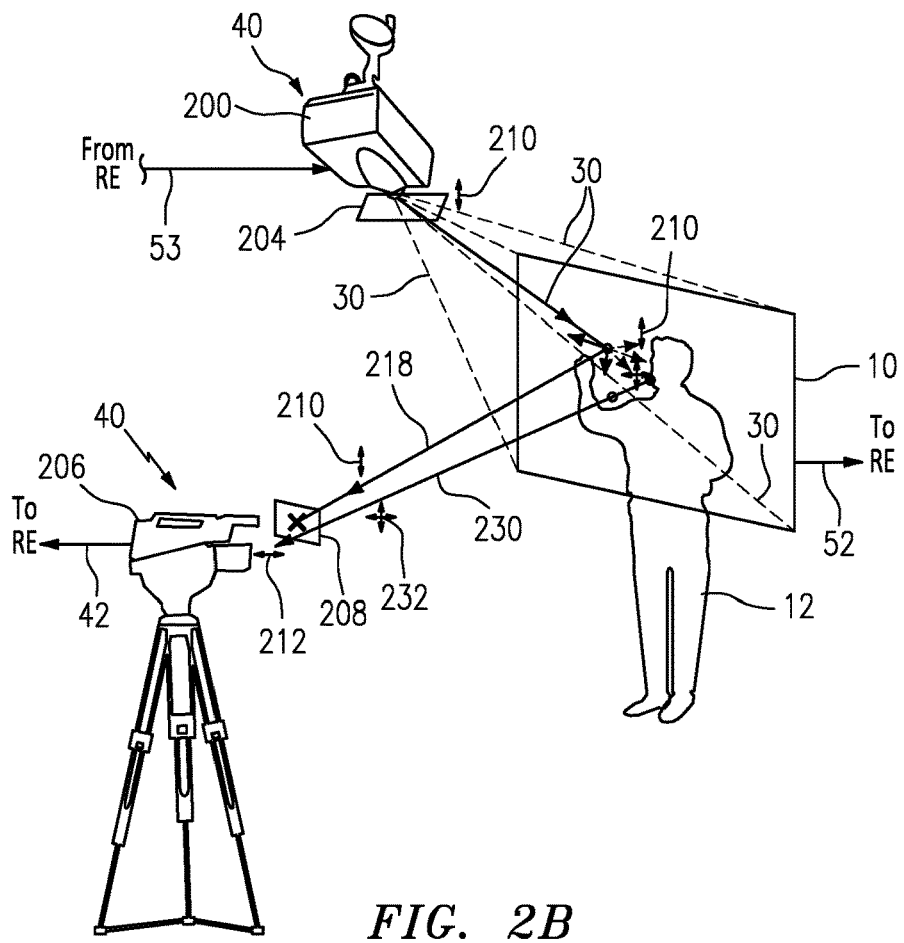
FIG. 2B is a partial front-screen view the diagram FIG. 2A, in accordance with embodiments of the present disclosure.

Referring to FIGS. 2A and 2B, in some embodiments, the system of the present disclosure may use polarization-gating to achieve the optical effects described above (using the optical property of polarization of the light). In particular, the projector system 32 may include a projector 202, e.g., a "long-throw" projector, Type/Model No. D963HD, made by Vivtek, and a vertical polarizer 204, e.g., Type/Model No. AP42-008T-PSA, made by American Polarizer, in the path of the optical projection signal 30 (or image or projection), which causes the optical projection image 30 to be vertically polarized, as indicated by a vertical polarization symbol 210. Other projectors and vertical polarizers may be used if desired. The long-throw projector 202 may be located about 15 feet from the screen 10. Other distances may be used provided the projector can focus the desired projection image 30 on the screen 10 with sufficient clarity for the talent 12 to read and interact with the image 30. Also, the camera system 40 may include a video camera 206, e.g., Type/Model No. EOS Rebel T7 made by Canon, and a horizontal polarizer 208, which only passes incident light that is horizontally polarized (or the horizontal polarization component of unpolarized light), as indicated by a horizontal polarization symbol 212, to the video camera 206. The projection image 30 is incident on the screen 10, and can be seen by the talent 12, and not by the camera 40, as described below.

In addition, the transparent screen 10 has a first surface 9 (or left surface for screen side-views shown herein) and an opposite second surface 11 (or right surface for screen side-views shown herein). The first surface 9 faces "Side A" (or first side or left side for screen side-views shown herein) of the screen 10, and the second surface 11 faces "Side B" (or second side or right side for screen side-views shown herein) of the screen 10, as used herein.

More specifically, as used herein, the phrase "Side A" (or first side or left side for screen side-views shown herein) of the screen 10 refers to positions in space located anywhere to the left of the left surface 9 of the screen 10 (or left-most surface of a screen assembly) for screen side-views shown herein. Thus, when a viewer is viewing from Side A (or the left side), it means a viewer located at and viewing from a position in space located anywhere to the left of the left surface 9 of the screen 10. A similar convention is used regarding the phrase "Side B" (or second side or right side for screen side-views shown herein) of the screen 10, which refers to positions in space located anywhere to the right of the right surface 11 of screen 10 (or right-most surface of a screen assembly) for screen side-views shown herein. Thus, when a viewer is viewing from Side B (or the right side), it means a viewer located at and viewing from a position in space located anywhere to the right of the right surface 11 of the screen 10.

In some embodiments, the optical projection image 30 provides vertically polarized 210 light that is projected onto the left surface 9 of the transparent screen 10. The transparent screen 10 may be a polarization-preserving, transparent, scattering projection screen, such that a portion 216 of the projected optical image 30 is reflected off of the screen 10 as reflected light 216 at various angles (back towards the camera 40) on the camera-side (or left side or first side or Side A) of the screen 10 and a portion 220 of the optical projection image 30 passes through the transparent screen as pass-through light 220, some of the pass-through light 220 passing straight through 222 the screen 10, and other portions 222 of the pass-through light 220 being scattered at various angles on the talent-side (or right side or second side, or Side B) of the screen 10. The reflected and pass-through light signals 216, 220 retain their polarization states, and are thus both vertically polarized 210, the same as the incident optical projection light signal 30.

A similar result would be obtained if the vertical polarizer 204 and horizontal polarizer 208 are swapped. In that case, the projected (or projection) image 30 would be horizontally polarized which would be blocked by the horizontal polarizer 208 at the camera.

The polarization-preserving transparent projection screen 10 may be a transparent particle-embedded plastic screen, such as Type/Model No. Cineclear II, made by ACP Noxtat or a transparent holographic screen, such as Type/Model No. HSI100 Holofoil, made by MediaScreen. Also, polarization-preserving transparent projection screen 10 may be tuned for use with the type of projector system 40 used, e.g., long-throw or short-throw projectors or other projectors. Any other type of polarization-preserving transparent projection screen may be used if desired, provided it provides the function and performance discussed herein.

For example, in some embodiments, a pixelated transparent display or a micro-LED display, or an OLED (organic-LED) display (where the space between the pixels may be randomly polarized), may be used if desired. In that case, the display may emit one state of polarization or one set of blue, green, red (or BGR) wavelengths for the content, while passing the orthogonal polarization or a different set of BGR wavelengths, respectively. Any other display screen that is emissive or projective may be used if desired, provided it performs the functions described herein.

A portion 218 of the vertically polarized reflected light 216 is incident on the camera system 40, the reflected light portion 218 also being vertically polarized 210. However, the horizontal polarizer 208 of the camera system 40 blocks the vertically polarized reflected light portion 218 from reaching the video camera 206. As a result, the camera 206 (or anyone or any device viewing from the camera side of the polarizer 208 and capable of viewing horizontally polarized light 212) does not view (or "see") the optical projection image 30 that is projected onto the screen 10. In addition, because the vertically polarized pass-through light 220 scatters at various angles off the screen 10, the projection image 30 is visible to the talent 12 on the talent-side of the screen 10 (or anyone or any device viewing from that side of the screen 10 and capable of viewing vertically polarized light 210). Thus, the various graphical elements 14, 16, 18, 19 (FIG. 1A) of the projection image 30 are visible to the talent 12 (viewing from one side, e.g., Side B, of the screen 10), but are not visible to (or not "seen" by) the camera system 40 (viewing from the opposite side, e.g., Side A, of the screen 10), due to polarization gating (or blocking) by the camera system 40.

In addition, studio or stage lights 240, which provide stage lighting 242 is randomly polarized 232 (or un-polarized or non-polarized) and illuminates (or reflects off) the talent 12, as an illuminated talent image 230. The talent image 230 passes through the transparent projection screen 10 toward the camera 40, where the horizontal component of the randomly polarized image 230 passes through the horizontal polarizer 208 to the camera 206 and the non-horizontal components of the image 230, e.g., vertical component, are extinguished or blocked, as indicated by the "X". As a result, the camera 206 (or anyone or any device viewing from the camera side of the polarizer 208 and capable of viewing horizontally polarized light 212) views (or "sees") the talent image 230 of the talent 12 standing on the other side of the screen 10.

The brightness of talent image 230 may be attenuated due to the blocking of the non-horizontal polarization components by the horizontal polarizer 208. To compensate for such attenuation, the brightness of the image 230 viewed by the camera 208 may be increased by increasing the intensity of stage lighting 242 to the desired brightness or the camera gain (or sensitivity or amplification) may be increased to boost the intensity of the viewed image signal. In some embodiments, to reduce such attenuation, the stage lighting may be polarized (linearly or circularly) in way that causes the talent image to polarized (or at least partially polarized) such that it is passed by the polarizer (or filter) on the camera side of the screen.

Thus, the camera image provided on the line 42 by the camera system 40 to the rendering engine 50 will include the talent image 230 of the talent 12 and will not include the projection image 30, as shown by the image 44 in FIG. 1A (discussed herein above).

Figure 3A:
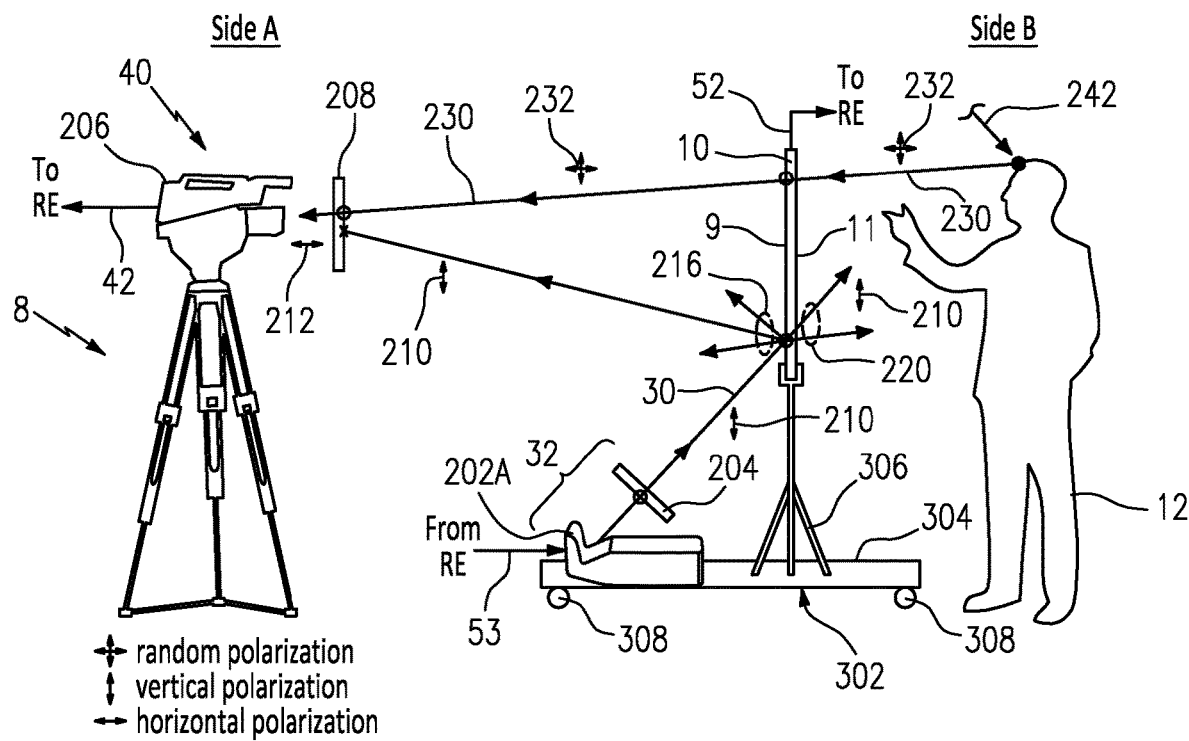
FIG. 3A is a diagram of optical components of another embodiment of the system of FIG. 1A using linear polarization gating, showing a side view of a screen and propagating light, in accordance with embodiments of the present disclosure.
Figure 3B:
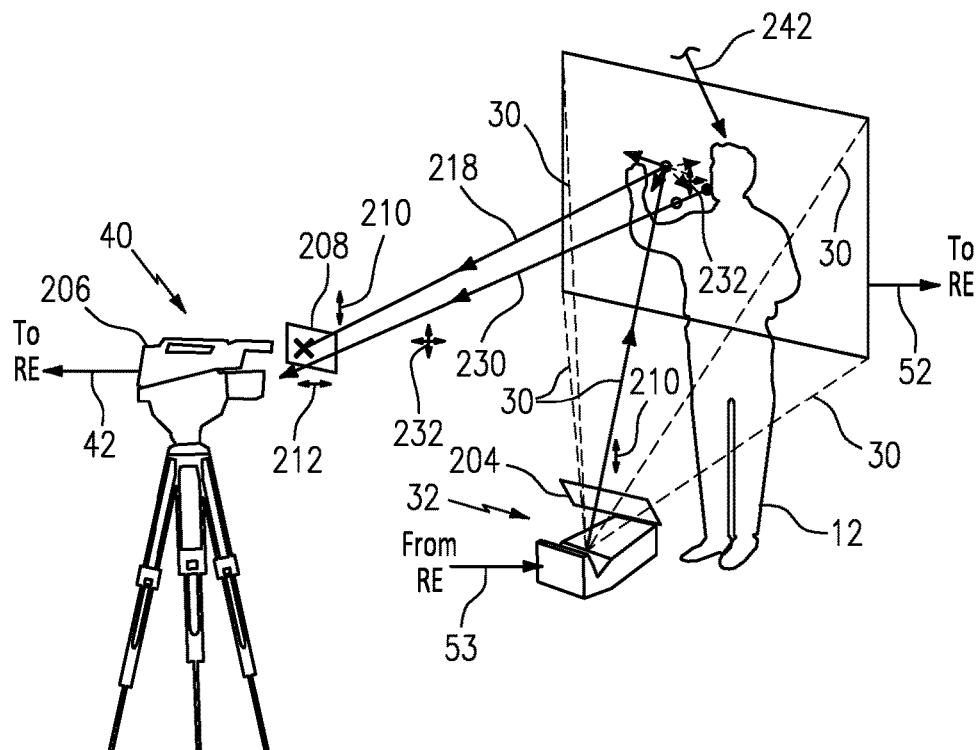
FIG. 3B is a partial front-screen view the diagram FIG. 3A, in accordance with embodiments of the present disclosure.

FIGS. 3A and 3B are similar to that shown in FIGS. 2A and 2B using polarization gating described hereinbefore, except the system 8 is configured with a projection system 32 where the projector 202A may be a "short-throw" projector, e.g., Type/Model No. GT5500, made by Optoma. In that case, the projector system 32 may be placed close to the screen 10, e.g., less than 1 foot (or between 1 and 2 feet) from the screen 10 and may be disposed on the floor (or other location that is conveniently close to the screen 10). This is different from the "long-throw" projector 202 of FIGS. 2A and 2B (mounted to the ceiling or a point above the screen 10), may be placed a predetermined long distance from the screen 10, e.g., more than 10 feet (or between 6 and 12 feet) from the screen 10.

In some embodiments, the projector system 32 and screen 10 may be disposed on a portable cart 302 having a platform 304, a stand 306 holding the screen 10, and wheels 308, which may be lockable to hold the cart 302 in the desired position between the talent and the camera system 40. The projector system 32 is disposed a predetermined distance, e.g., 1 foot, from the screen 10. Other distances may be used provided the projector system focuses the projection image 30 on the screen 10 with sufficient clarity for the talent 12 to read and interact with the image 30. The cart 302, the platform 304, and stand 306 are made of a material strong enough to provide sufficient support and stability for the projector system 32 and the screen 10, to allow the system 8 to perform the functions described herein. The cart 302 may be used with any of the embodiments described herein.

Also, for any of the embodiments disclosed herein, the angle of the projector system 32 (or the projector) or the projection image 30 or other components are not critical to the performance of the system of the present disclosure. In particular, the system 8 is projection-angle and viewing-angle independent or agnostic, and does not have any requirements or rely on the angle of the camera 40, the angle of the projector system 32 (or projector), the viewing angle of the talent 12, or the angle of the screen 10 to provide the functions and performance described herein. This is different from certain prior art transparent display systems that are reflection-angle based, such as certain teleprompters, heads-up displays, and the like.

Figure 4A:
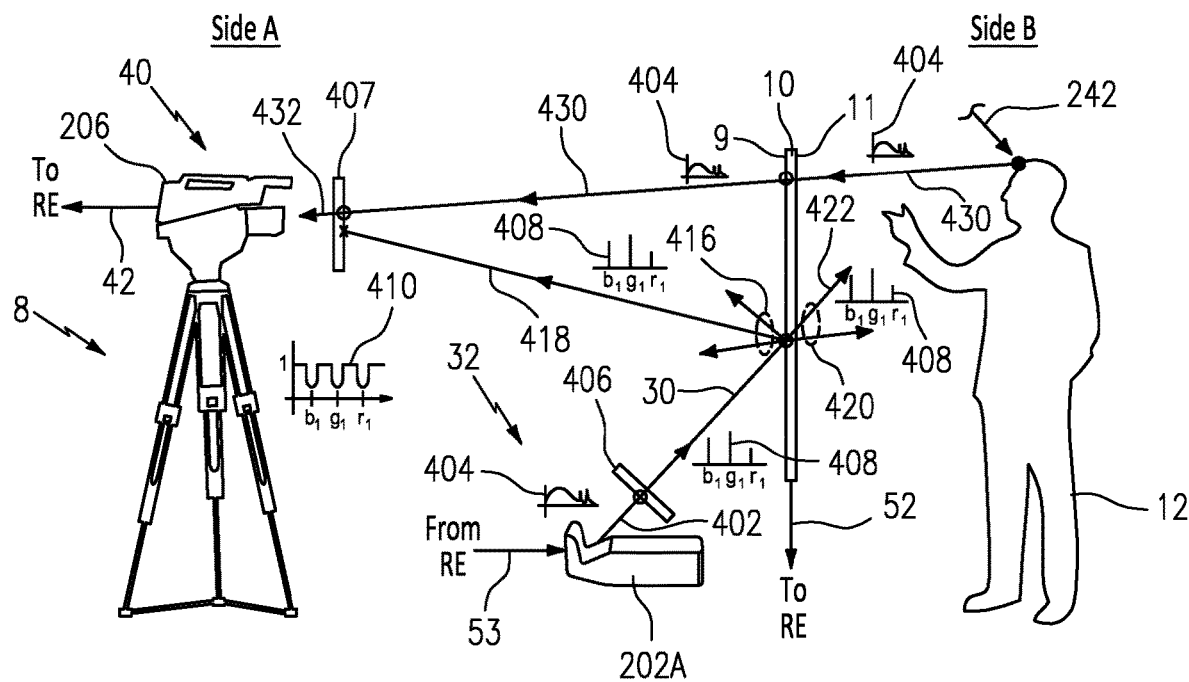
FIG. 4A is a diagram of optical components of another embodiment of the system of FIG. 1A using wavelength gating, showing a side view of a screen and propagating light, in accordance with embodiments of the present disclosure.
Figure 4B:
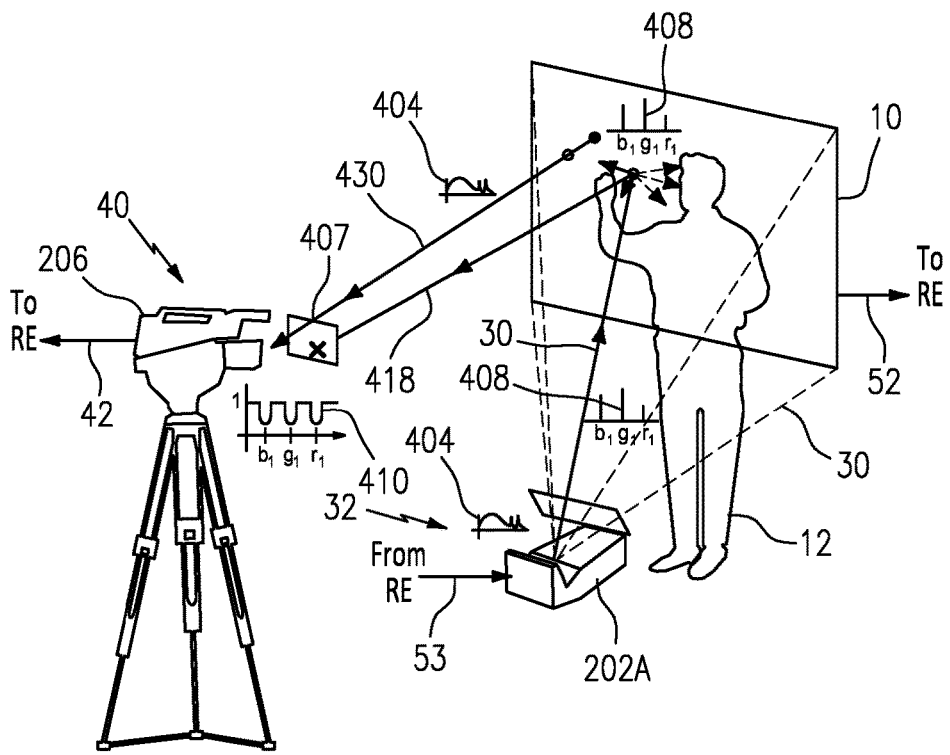
FIG. 4B is a partial front-screen view the diagram FIG. 4A, in accordance with embodiments of the present disclosure.

Referring to FIGS. 4A and 4B, to avoid cross-talk from depolarization due to scattering or for other reasons, some embodiments of the present disclosure may use wavelength (or color) filtering or gating (using the optical property of wavelength of light). In particular, the projector 202A of the projector system 32 provides a projection image 402 having a broad wavelength range, shown by the wavelength graph 404, that includes wavelengths associated with Red, Green, and Blue colors. The light 402 from the projector 202A passes through a color filter 406, e.g., Type/Model No. Primor, made by Infitec, which allows a small range of wavelengths associated with each of Blue (wavelength B1), Green (wavelength G1), Red (wavelength R1) colors, or b1g1r1, that make-up the projection image 30. Also, the camera system 40 may include the video camera 206 (discussed herein above) and an inverse (or orthogonal) color filter 407, e.g., Type/Model No. Primor, made by Infitec, which blocks (or absorbs) wavelengths corresponding to each of Blue (wavelength B1), Green (wavelength G1), Red (wavelength R1) colors, or b1g1r1, as indicated by a graph 410. The two filters 406, 407 may come as a set in a Primor Development Kit.

The projection image 30 (having only wavelengths B1,G1,R1, or b1g1r1) is incident on the transparent projection screen 10 and can be seen by the talent 12; however, the image 30 is not seen by the camera 40, as described below. In particular, the projection image 30 is incident on the screen 10 such that a portion 416 of the projection image 30 is reflected off of the screen 10 as reflected light 416 at various angles on the camera-side of the screen 10 and a portion 420 of the optical projection image 30 passes through the transparent screen 10 as pass-through light 420, a portion 422 of the pass-through light 420 passing straight through the screen 10, and other portions of the pass-through light 420 being scattered at various angles on the talent-side of the screen 10. The reflected and pass-through light signals 416, 420 retain their wavelength components, and, thus, both optical light signals 416, 420 have the wavelengths B1,G1,R1 (as indicated by the wavelength graph 408), which is the same as the optical projection light signal (or image) 30 incident on the screen 10.

A portion 418 of the B1,G1,R1 wavelength reflected light 416 is incident on the camera system 40. However, the inverse color filter 404 of the camera system 40 blocks (or absorbs, or filters-out, or attenuates, or extinguishes) the B1,G1,R1 wavelengths of the reflected light 418 from reaching the video camera 206. As a result, the camera 206 does not view (or "see") the B1,G1,R1 optical projection image 30 that is projected onto (and reflected off) the left surface 9 of the screen 10. In addition, because the pass-through light 420 scatters at various angles off the screen 10 on the talent-side of the screen 10, the B1,G1,R1 optical projection image 30 is visible to the talent 12 (or anyone or any device viewing from that side of the screen 10 and capable of viewing B1,G1,R1 wavelength light 408). Thus, the various graphical elements 14, 16, 18, 19 (FIG. 1A) of the projection image 30 are visible to the talent 12, but are not visible to (or not "seen" by) the camera system 40, due to wavelength gating (or blocking) by the camera system 40.

In addition, studio or stage lighting 242 covers the visible spectrum and thus has the broad wavelength spectrum (shown as the graph 404) and illuminates (or reflects off) the talent 12, as a broad-wavelength illuminated talent image 430. The broad-wavelength talent image 430 passes through the transparent projection screen 10 towards the camera 40, where only the 3 narrow color bands are absorbed by the inverse color filter 407 (shown by the wavelength graph 410), and the rest of the incident light signal passes through to the video camera 206. As a result, the camera 206 views (or "sees") the talent image 430 of the talent 12 standing on the other side of the screen 10.

For this embodiment, the transparent projection screen 10 may be the same as the screen 10 shown in FIGS. 2A and 2B; however, the screen 10 should be wavelength-preserving (i.e., not shift or alter the wavelength upon reflection or transmission), and it is not necessary for the screen 10 to be polarization-preserving (as polarization is not relevant for this embodiment).

Figure 5A:
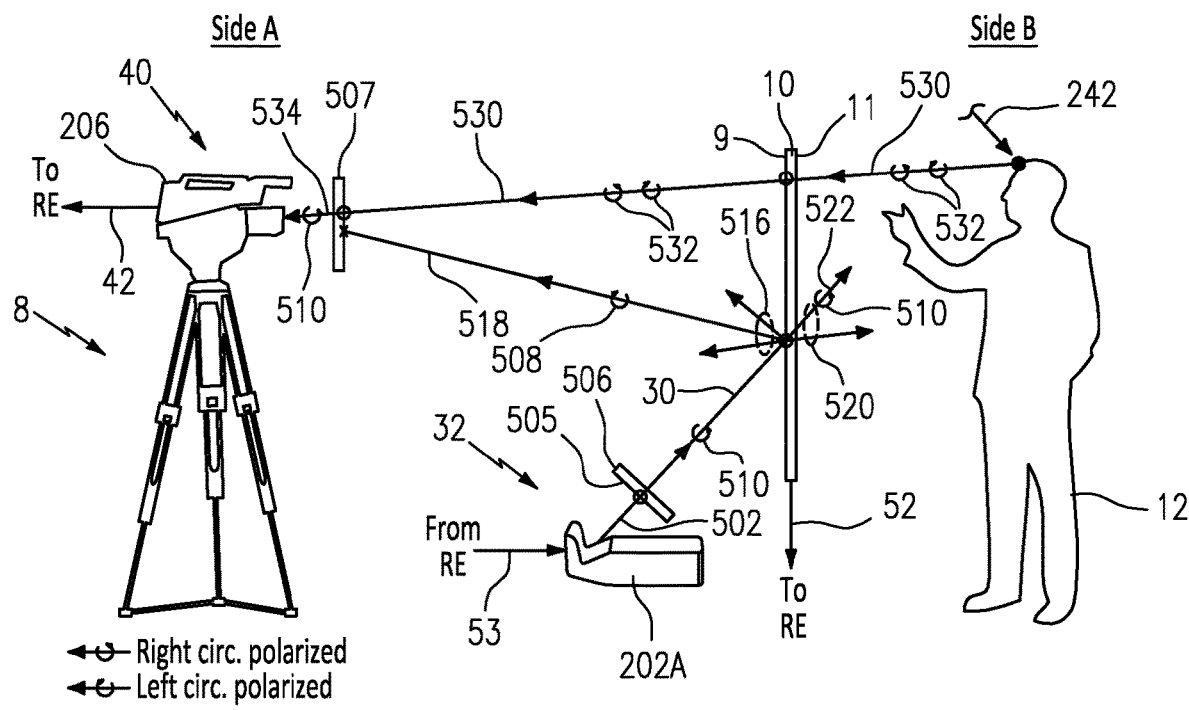
FIG. 5A is a diagram of optical components of another embodiment of the system of FIG. 1A using circular polarization gating, showing a side view of a screen and propagating light, in accordance with embodiments of the present disclosure.
Figure 5B:
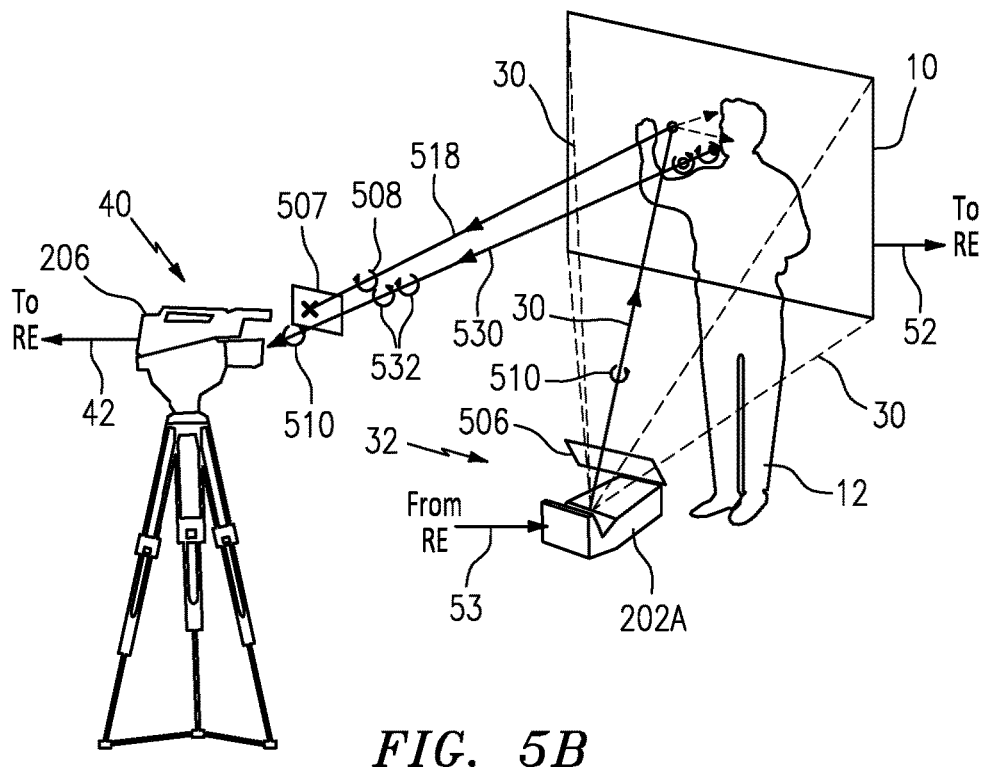
FIG. 5B is a partial front-screen view the diagram FIG. 5A, in accordance with embodiments of the present disclosure.

Referring to FIGS. 5A and 5B, in some embodiments, the system of the present disclosure may use circular polarization (with reflection cancellation) to achieve the optical effects described herein. In particular, the short-throw projector 202A of the projector system 32 provides a projection image 502 having a randomly polarized light. The light 502 from the projector 202A passes through an anti-reflection coating 505 and a right circular polarizer 506, e.g., Type/ Model No. APNCP42-010T-RH, made by American Polarizer, which passes only right circularly polarized light, as indicated by a right circularly polarized symbol 510 (as viewed from the light source), which is the projection image 30. Also, the camera system 40 may include the video camera 206 (discussed herein above) and a right circular polarizer 507, similar to the polarizer 506, which passes only right circularly polarized light, as indicated by a right circularly polarized symbol 510 (as viewed from the propagation direction of the light beam). Unless otherwise indicated herein, the convention used for circularly-polarized light herein is as viewed from the propagation direction of the light beam.

The projection image 30 (having only right-circularly polarized light) is incident on the transparent projection screen 10, e.g., a polarization preserving transparent screen, and the image 30 can be seen by the talent 12; however, the image 30 is not seen by the camera 40, as described below. In particular, the projection image 30 is incident on the screen 10 such that a portion 516 of the projection image 30 is reflected off of the screen 10 as reflected light 516 at various angles on the camera-side of the screen 10 and a portion 520 of the optical projection image 30 passes through the transparent screen 10 as pass-through light 520, a portion 522 of the pass-through light 520 passing straight through the screen 10, and other portions of the pass-through light 520 being scattered at various angles on the talent-side of the screen 10.

The reflected light 516 from the screen 10 of the image 30 becomes left-circularly polarized of opposite handedness (because of the reflection), as shown by the symbol 508, which is the opposite polarization to the right-circularly polarized 510 of the optical projection light signal 30 incident on the screen 10. However, the pass-through light signals 520, 522 retain their right-circularly polarized state (as indicated by the symbol 510), which is the same as the polarization of optical projection light signal 30 incident on the screen 10.

A portion 518 of the left-circularly polarized reflected light 516 is incident on the camera system 40. However, the right circular polarizer 507 of the camera system 40 only passes (allows through) right-circularly polarized light and blocks (or absorbs, or filters-out, or attenuates, or extinguishes, as indicated by an "X") the left-circularly polarized reflected light 518 from reaching the video camera 206. As a result, the camera 206 does not view (or "see") the optical projection image 30 that is projected onto and reflected off the left surface 9 screen 10 as the reflected light 518. In addition, because the pass-through light 520 scatters at various angles off the screen 10 on the talent-side of the screen 10, the optical projection image 30 is visible to the talent 12 (or anyone or any device viewing from that side of the screen 10). Thus, the various graphical elements 14, 16, 18, 19 (FIG. 1A) of the projection image 30 are visible to the talent 12 (viewing from one side, e.g., Side B, of the screen 10), but are not visible to (or not "seen" by) the camera system 40 (viewing from one side, e.g., Side A, of the screen 10), due to polarization gating (or blocking) by the camera system 40 described above.

In addition, studio or stage lighting 242 is randomly polarized 532 (or un-polarized or non-polarized) and illuminates (or reflects off) the talent 12, as an illuminated talent image 530. The talent image 530 passes through the transparent projection screen 10 toward the camera 40, where the right-circularly polarized component of the randomly polarized image 530 passes through the right-circular polarizer 507 to the camera 206 (and the non-right circular components of the talent image 530, e.g., left-circular component, are extinguished or blocked). As a result, the camera 206 views (or "sees") the talent image 530 of the talent 12 standing on the other side of the screen 10. The brightness of talent image 530 may be attenuated due to the blocking of the non-right circular components by the polarizer 507; however, the brightness of the image 530 viewed by the camera 208 may be increased by increasing the intensity of stage lighting 242 to the desired brightness, similar to that discussed herein above with linear polarization gating.

A similar result would be obtained if the right-circular polarizers 506, 507 in the projector system 32 and the camera system 40, respectively, are replaced with left-circular polarizers. In that case, the projection image 30 would be left-circularly polarized, and the reflected image 518 would be right-circularly polarized, which would be blocked by the left circular polarizer 507 at the video camera 206. Similarly, the unpolarized talent image 530 would pass through the screen 10 toward the camera 40 and the left-polarization component would pass through the left circular polarizer 507 and be viewed by the camera 206.

Also, a similar result would be obtained if the right-circular polarizer 507 is reversed (or flipped) such that the incident light 508, 530 passes backwards through the right circular polarizer 507. In the case, the light 534 exiting the flipped polarizer 507 would be −45 degree linearly polarized (and still be seen by the camera 206), and the circularly polarized light 518 would still be blocked, similar to that described with FIG. 5C hereinafter.

Figure 5C:
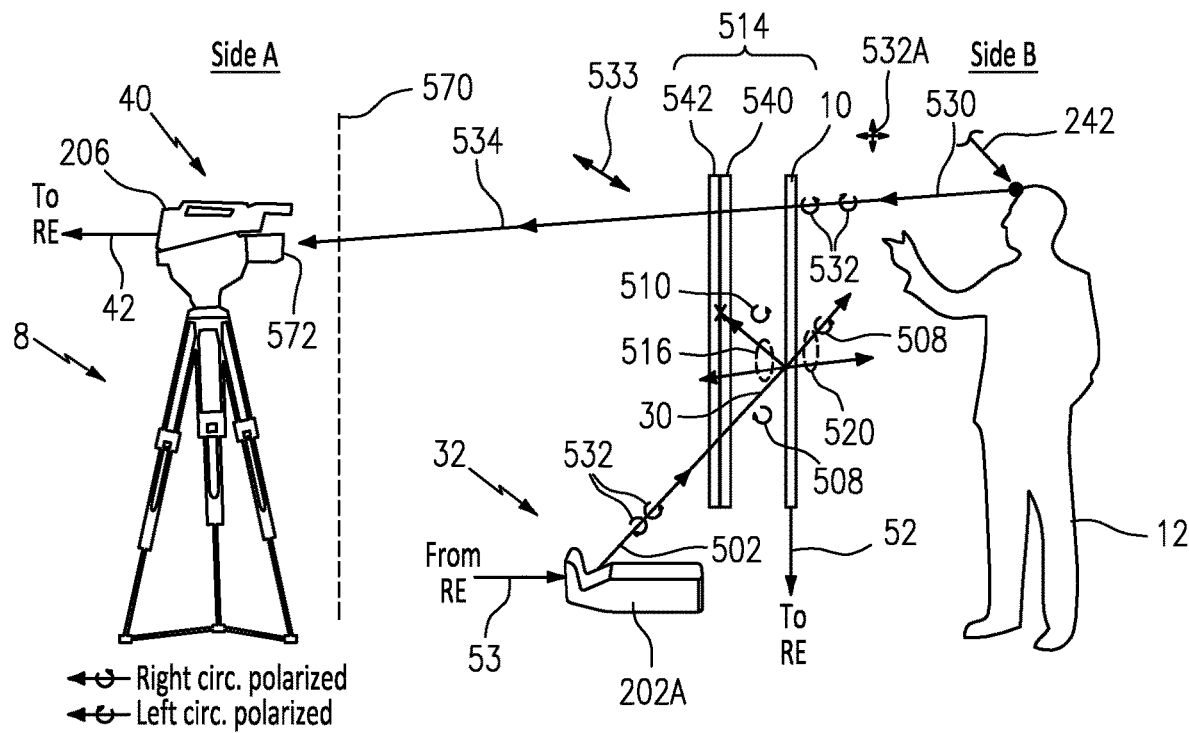
FIG. 5C is a diagram of optical components of another embodiment of the system of FIG. 5A using circular polarization gating with a stand-alone screen, showing a side view of a screen and propagating light, in accordance with embodiments of the present disclosure.
Figure 5D:
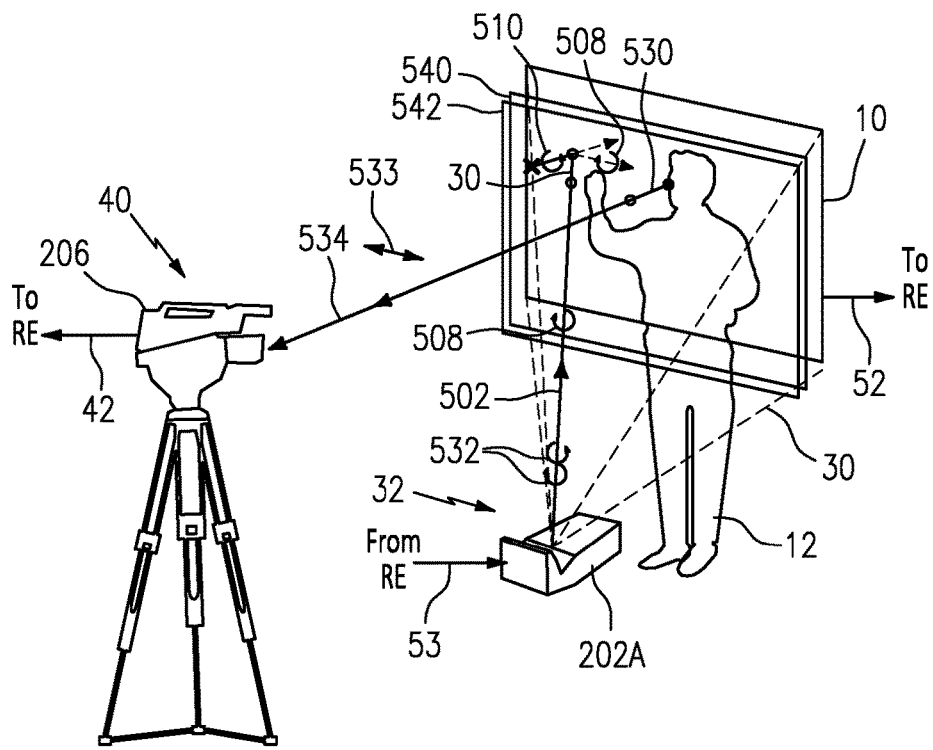
FIG. 5D is a partial front-screen view the diagram FIG. 5C, in accordance with embodiments of the present disclosure.

Referring to FIGS. 5C and 5D, instead of using separate (left and right) circular polarizers 506, 507, respectively, shown in FIGS. 5A, 5B as separate optical components associated with the camera 206 (or the camera system 40) and the projector 202A (or the projector system 32), in some embodiments, the circular polarizers 506, 507 may be a single optical component or element 540 disposed on or near or integrated into the surface of the screen 10. In particular, in FIGS. 5C and 5D, a left circular polarizer 540, having an anti-reflection coating 542, may be disposed on or near or integrated into the camera-side (or left side or Side A) of the screen 10, to provide the optical effects described herein, which may be referred to herein as an "on screen" polarization-gating arrangement. Also, the combination of the left circular polarizer 540 with anti-reflection coating 542 and the screen 10, may collectively be referred to as a screen assembly 514. In that case, the projection light 502 from the projector 202A, which is randomly polarized 532, passes through the anti-reflection coating 542 and the left-circular polarizer 540, as the projection image 30 having left-circular polarization 508 (propagation direction of the light beam), which is incident on the screen 10.

The pass-through portion 520 of the projection image 30 passes through the screen 10 having the same polarization 508 as the incident light 30, and the projection image 30 is visible to the talent 12 as described herein above. The reflected portion 516 (toward the camera 206) of the projection image 30 will change polarization upon reflection off the screen 10 (as described herein above) and become right-circularly polarized 510, which will be extinguished by the left-circular polarizer 540 (as indicated by the "X"). The randomly polarized (or unpolarized) talent image 530 would pass through the screen 10 toward the camera 40 and would pass backwards through the left circular polarizer 540 and through the anti-reflection coating 542, and become −45 degree linearly polarized 533 light 534 (as viewed from the talent light source along the propagation path of the light) and would be viewed by the camera 206 (as described herein above).

In particular, a circular polarizer is created using a 45 degree linear polarizer followed by a quarter-wave plate (or retarder) in that order, for light propagating "forward" through the polarizer (as is known) and converts unpolarized light to circularly polarized light. Conversely, when light is passed "backwards" thru the polarizer, unpolarized light will be converted to 45 degree linearly polarized light (as is known). One can use either 45 degree linearly polarized light and −45 degree linearly polarized light or horizontal and vertical polarized light, depending on the orientation of the linear polarizers.

Also, the symbol for unpolarized light may be shown herein as dual clockwise and counterclockwise circular arrows 532, or dual perpendicular crossing line arrows 532A, depending on the desired convention, e.g. polar or rectangular, respectively.

Using "on-screen" polarization-gating described herein avoids the need to have separate polarization-gating polarizers or filters, respectively, placed over the video camera 206 and the projector 202, 202A, as part of the camera system 40 and the projector system 32, respectively.

Thus, the camera image 44 (FIG. 1A) provided by the camera system 40 to the rendering engine 50 on the line 42 will include the talent image 530 of the talent 12 and will not include the projected (or projection) image 30 from the projector 202A.

Also, as discussed herein above with FIG. 1A, in addition to the talent 12 seeing the projection image 30 on the transparent screen 10, the talent 12 also sees through the transparent screen 10 (or screen assembly) and views things or images on the camera side (because the screen 10 is transparent and the images are illuminated with studio or stage lighting). In particular, the camera system 40 (and anything on the camera side of the screen 10) is visible to the talent 12 through the transparent screen 10.

In some embodiments, the camera 206 (except for the camera lens) may be covered by a cover screen or other cover material 570 to improve or enhance the contrast for the talent 12 viewing the projection image 30 on the transparent screen 10, or for other reasons to avoid having the talent 12 see the camera 40, provided the camera 206 viewing lens 572 can view or see the screen 10. In that case, there may be a background or foreground image or video (or a single color or color scheme) displayed or projected on the cover screen 570 to enhance the view seen by the talent 12. In some embodiments, there may be one or more people (not shown) located on the camera-side (Side A) of the screen 10, e.g., one or more commentators, that are visible to the talent 12 through the screen 10 and may be interacting with the talent 12, or providing the talent 12 with visual instructions or cues.

Figure 6A:
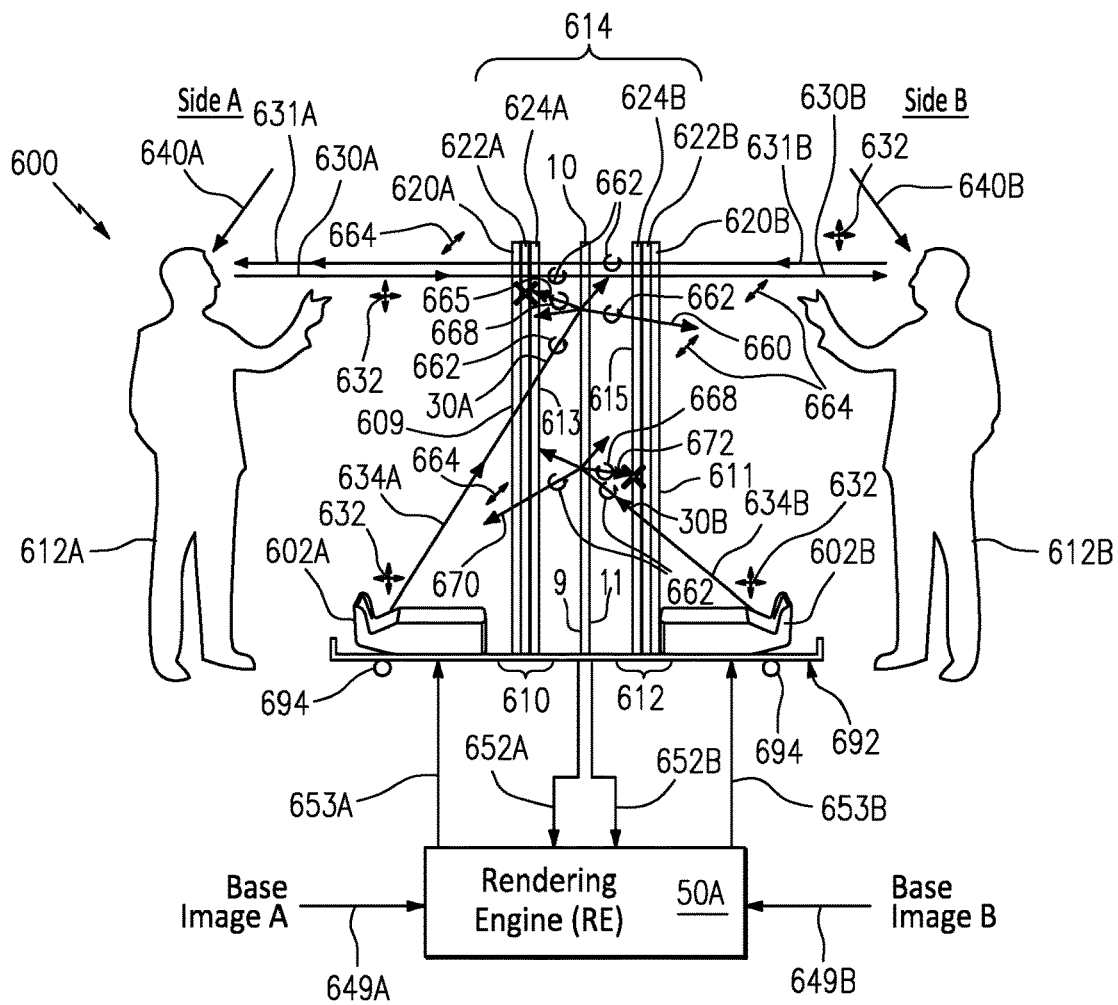
FIG. 6A is a block diagram of optical components of a two-sided transparent display system, showing a side view of a screen and propagating light, in accordance with embodiments of the present disclosure.
Figure 6B:
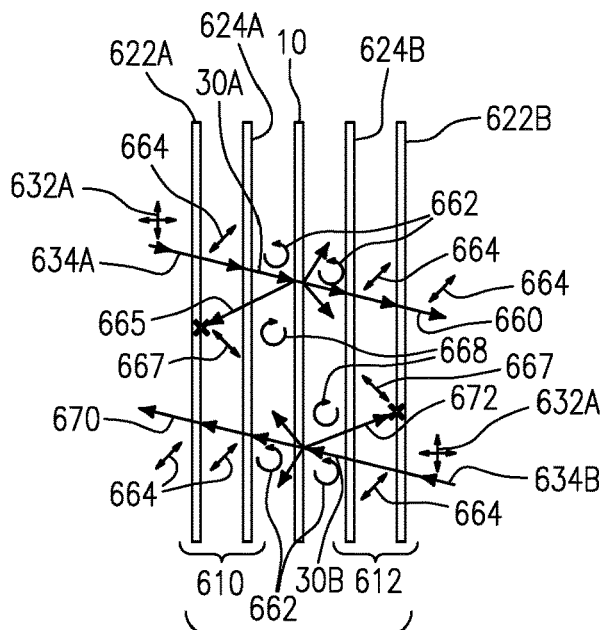
FIG. 6B is a diagram showing polarization of light passing-through and reflecting-off certain optical components of FIG. 6A, showing a side view of a screen and propagating light, in accordance with embodiments of the present disclosure.

Referring to FIGS. 6A and 6B, in some embodiments, circular polarization gating (with reflection-cancellation), such as that shown in FIGS. 5C & 5D, may be used to provide a "two-sided" (or multi-person) display screen system 600, as described below. In particular, a first viewer 612A (or Viewer A, similar to the video camera 206 or the camera system 40 in other embodiments herein), may be located on one side (e.g., the left side or Side A) of the polarization-preserving transparent screen 10, and a second viewer 612B (or Viewer B), may be located on an opposite side (e.g., the right side) of the screen 10. Also, a first short-throw projector 602A, similar to the short throw projector 202A (FIG. 5A), is located on the same side as the Viewer A, and a second short-throw projector 602B, similar to the short throw projector 202A, is located on the same side of the screen 10 as the Viewer B.

As described in more detail below, the Viewers A and B, 612A, 612B, respectively, can see each other through the transparent display 10 together with images projected on the screen 10 by only the opposite-side's projector 602B, 602A, respectively. Thus, the Viewer A 612A (viewing from Side A of the screen 10) can see Viewer B 612B (located on Side B of the screen 10) and images and graphics 634B projected on the screen 10 by only the second projector 602B (located on Side B, i.e., the opposite side of the screen 10 from Viewer A). Similarly, the Viewer B 612B (viewing from Side A of the screen 10) can see Viewer A 612A (located on Side A of the screen 10) and images and graphics 634A projected on the screen 10 by the first projector 602A (located on Side A, i.e., the opposite side of the screen 10 from Viewer B). Such visual effects are achieved using similar components and circular polarization-gating to that described above with FIGS. 5C and 5D on both sides of the screen 10, and replacing the camera system 40 with the Viewer A 612A, and the talent 12 with the Viewer B 612B. Also, in that case, a nonreflecting circular polarizer 610, 612 would be disposed on each side of the screen 10, respectively, between the screen 10 and the respective projectors 602A, 602B, each of the polarizers 610, 612 being similar to the on-screen circular polarizer 540 and AR coating 542, described with FIG. 5C.

In particular, the polarizer 610 has an outer surface 609 that faces the Viewer A 612A (or Side A) and an inner surface 613 that faces (and may touch or be disposed on or contiguous with) the left surface 9 of the screen 10. Also, the polarizer 612 has an outer surface 611 that faces the Viewer B 612B (or Side B) and an inner surface 615 that faces (and may touch or be disposed on or contiguous with) the right surface 11 of the screen 10. As described herein, the screen assembly 614 includes the polarizers 610, 612 with the transparent screen 10 disposed therebetween, and the outer surface 609 faces Side A (where the Viewer A is located and views from) and the outer surface 611 faces Side B (where the Viewer B is located and views from).

The circular polarizer 610 on the Viewer A side (left side or Side A) of the screen 10 may comprise an anti-reflection (AR) coating 620A, a 45 degree linear polarizer 622A, and a quarter-wave retarder (or quarter-wave plate) 624A, which may be configured as a contiguous single optical assembly 610. Similarly, the circular polarizer 612 on the Viewer B side (right side or Side B) of the screen 10 may comprise an anti-reflection (AR) coating 620B, a 45 degree linear polarizer 622B, and a quarter-wave retarder (or quarter-wave plate) 624B, which may be configured as a contiguous single optical assembly 612.

For each of the circular polarizers 610, 612, the combination of a 45 degree linear polarizer with a quarter-wave retarder (quarter-wave plate) create a left-circular polarizer (when viewed from the light receiving end) or a right-circular polarizer (when viewed from the light source end along the propagation direction of the light), as is known. The circular polarizers 610, 612 may each be disposed on or near their respective opposite sides of the screen 10, to provide the optical effects described herein. Also, the combination of the circular polarizers 610, 612 and the screen 10, may collectively be referred to as a screen assembly 614.

From the Viewer A side, the short throw projector 602A projects the imagery 634A (to be viewed by Viewer B only), towards a screen assembly 614. The projection light 634A passes through the AR (Anti-Reflection) coated right circular polarizer 610, which causes the projection image 30A to become right circularly polarized (when viewed from the source along the propagation direction of the light). The right circularly polarized projection light 30A is incident on the polarization-preserving transparent projection screen 10, similar to that described herein above. The pass-through light 660 remains right-circularly polarized 662, and passes "backwards" through the right circular polarizer 612, to become 45 degree linearly polarized 664 which can be seen by the Viewer B (612B).

The projection light 30A is also reflected 665 by the screen 10 back towards the Viewer A and becomes left-circularly polarized 668 of the opposite handedness, but is extinguished (or blocked) by the combination of the quarter-wave retarder (or quarter-wave plate) 624A and the 45 degree polarizer 622A (equivalently, a (right) circular polarizer), as indicated by an "X" in FIGS. 6A and 6B. More specifically, referring to FIG. 6B, the incident light 30A reflects off the screen 10 and becomes left circularly polarized 668, and then becomes −45 degree linearly polarized 667 light 665 by the quarter-wave plate 624A and then is blocked (or extinguished) by the +45 degree linear polarizer 622A (as it is opposite polarization from the −45 degree polarized light 665).

Thus, the Viewer A 612A (viewing from Side A of the screen 10) does not see the reflected image 665 of the projection image 30A from the short throw projector 602A on Viewer A's side (Side A) of the screen 10, similar to that discussed with FIGS. 5C and 5D.

Similarly, from the Viewer B side (Side B of the screen 10), the short throw projector 602B projects the imagery 634B, towards a screen assembly 614. The projection light 634B passes through the anti-reflection coating 620B and the right circular polarizer 612, which causes the projection image 30B to become right circularly polarized (when viewed from the source along the propagation direction of the light). The right circularly polarized projection light 30A is incident on the polarization-preserving transparent projection screen 10, similar to that described herein above. The pass-through light 670 remains right-circularly polarized 662, and passes "backwards" through the right circular polarizer 610, to become 45 degree linearly polarized 664 which can be seen by the Viewer A (612A).

The projection image light 30B is also reflected 672 by the screen 10 back towards the Viewer B and becomes left-circularly polarized 668 of the opposite handedness, but is extinguished by the combination of the quarter-wave retarder (or quarter-wave plate) 624B and the 45 degree linear polarizer 622B (equivalently a right circular polarizer), as indicated by an "X" in FIGS. 6A and 6B. More specifically, referring to FIG. 6B, the incident light 30B reflects off the screen 10 and becomes left circularly polarized 668, and then becomes −45 degree linearly polarized 667 light 672 by the quarter-wave plate 624B and then is blocked (or extinguished) by the +45 degree linear polarizer 622B.

Thus, the Viewer B 612B (viewing from Side B of the screen 10) does not see the reflected image 672 of projection image 30B from the short throw projector 602B on Viewer B's side (Side B) of the screen 10, similar to that discussed with FIGS. 5C and 5D.

Referring to FIG. 6B, the polarization states are shown for the incident light 634A from the projector 202A (from the left side (Side A) of the screen 10) as it passes through the components 622A, 624A of the circular polarizer 610 to the screen 10, and the polarization states for the incident light 634B from the projector 202B (from the right side (Side B) of the screen 10) as it passes through the components 622B, 624B of the circular polarizer 612 to the screen 10.

Ambient or studio light 630A reflected from the Viewer A is randomly polarized 632 and travels towards the Viewer B through the right circular polarizer 610, where it becomes right circularly polarized 662, then passes through the transparent projection screen 10, and then passes "backwards" through the right circular polarizer 612, to become 45 degree linearly polarized 664 which is visible by the Viewer B as the image 630B. A similar effect occurs for ambient (or studio) light 631B reflected from the Viewer B is randomly polarized 632, and travels towards the Viewer A through the right circular polarizer 612, where it becomes right-circularly polarized 662, then passes through the transparent projection screen 10, and then passes "backwards" through the right circular polarizer 610, to become 45 degree linearly polarized 664 which is visible by the Viewer A as the image 631A.

Thus, the Viewer A (FIG. 6A), viewing from Side A of the screen 10, can see the Viewer B through the projection screen 10 and the Viewer A can also see the projection image 30B projected by the projector 602B. Similarly, the Viewer B (viewing from Side B of the screen 10) can see the Viewer A through the projection screen 10 and Viewer B can also see the projection image 30A projected by the projector 602A.

In some embodiments, the projectors 602A, 602B and the screen assembly 614, may be disposed on a portable cart 692, similar to the cart 302 described herein above with FIG. 3A, having a platform 691, and wheels 694, which may be lockable to hold the cart 692 in the desired position between the Viewers A,B. The screen assembly 614 may be rigidly disposed directly to the platform (as shown) or may be elevated and held by a stand, like the stand 306 shown in FIG. 3A. The short-throw projectors 602A, 602B are disposed a predetermined distance from the screen 10, as discussed herein above, that allows the projectors 602A, 602B to focus the projection images 634A, 634B on the screen assembly 614 with sufficient clarity for the Viewers A,B to read and interact with the projection images 634A, 634B or 30A, 30B. Any other cart or platform or structure may be used if desired to support the projectors 602A, 602B and screen assembly 614.

A rendering engine 50A (FIG. 6A) for the two-sided display screen 10 is similar to the Rendering Engine 50 for the one-sided screen shown in FIGS. 1A, 2A, and the like, except that there are two digital image signals (digital Viewer A Image signal and digital Viewer B image signal) on lines 653A, 653B, providing signals to two projectors 602A, 602B, creating two projection images 30A, 30B, for separate viewing by the two Viewers B,A respectively, and there is no Camera 40 (FIG. 1A). There are also two image inputs, Base Image A provided on a line 649A, to be projected by the projector 602A (together with the Viewer A's actions, or the results thereof) and viewed only by Viewer B, and Base Image B provided on a line 649B, to be projected by the projector 602B (together with the Viewer B's actions, or the results thereof) and viewed only by Viewer A, as described above. Also, the two-sided rendering engine 50A receives two action/motion inputs on lines 652A, 652B, one from the left side of screen 10 (capturing actions by Viewer A) and the other right side of the screen 10 (capturing actions by Viewer B), respectively. The screen 10 or a separate device (not shown) may have the necessary sensors, hardware, firmware, or software capable of sensing such actions of the Viewers A,B and providing data associated therewith to the rendering engine 50A, similar to that done for the one-sided display discussed herein.

Referring to FIG. 8, a flow diagram 800 illustrates one embodiment of a process or logic for implementing the two-sided Rendering Engine Logic 50A, which may be implemented in hardware, software, or firmware, or the like. The process/logic 800 begins at block 802 by receiving a "Base" Image A to be viewed by Viewer B and a Base Image B to be viewed by Viewer A. The Base Images A,B may be an underlying background image (or graphics or video) desired to be used as a background image for Viewers A,B, respectively.

Next, block 804 determines if data has been received that is indicative of action or motion by Viewer A, e.g., swinging a ping-pong paddle, detected directly by the screen 10 (e.g., touch screen), or by sensors such as cameras or other detectors (in the screen or separate therefrom) which identify hand motion (or other action) of the Viewer A. If action/motion data has been received for Viewer A, a block 806 determines the type of motion and creates or updates a Viewer A Image (from Viewer A's perspective) and a corresponding Viewer B Image (from Viewer B's perspective) in response to Viewer A's motion. If the result of block 804 is NO, or after performing block 806, the logic proceeds to block 808, which determines if data has been received that is indicative of motion by Viewer B. If action/motion data has been received for Viewer B, a block 810 determines the type of action and creates or updates a Viewer A Image (from Viewer A's perspective) and a corresponding Viewer B Image (from Viewer B's perspective) in response to Viewer B's motion. Then, the logic exits.

Accordingly, the "two-sided" Rendering Engine 50A (FIG. 6A) creates side-specific digitized input graphic images (similar to the single-sided image 54, FIG. 1A), one for each side, having side-specific digital pixels or location coordinates which map to the corresponding side of transparent screen 10, indicative of the movements (or the reaction of the movements) of the respective Viewers A,B, which are detected and mapped onto the side-specific digitized graphic images, such each of the Viewers' A,B motions. The rendering engine 50B then combines (or mergers or adds) the Viewers' A,B motions (or the reaction of the motions) with the corresponding Base Image A and Base Image B, using the side-specific mapping information and software that interprets the movement and a reaction thereto, to create the digital Viewer A Image signal and the digital Viewer B image signal which are provided to the projectors 602A, 602B on the lines 653A, 653B. Then, the resultant Viewer A Image is displayed on the screen 10 for the Viewer B to view (and react to if desired), and the resultant Viewer B Image is displayed on the screen 10 for the Viewer B to view (and react to if desired).

Referring to FIG. 9, a screen illustration is shown of an image 900 of an interactive game, e.g., an electronic ping-pong game having the Viewers A,B as players, as viewed by Viewer B from Viewer B's side of the screen 10. In particular, the image 900 seen by the Viewer B, includes the Base Image B, i.e., the virtual items in the image, e.g., the ping-pong table 902, the net 904, the ping-pong ball 908, and the surrounding areas, together with the real-world visible items, including the Viewer A holding an actual ping-pong paddle 906, which would be real and visible by Viewer B through the transparent screen 10. When the game is being played, if Viewer B (near side of image) hits the virtual ping-pong ball 908 with his real-world ping-pong paddle (not shown, near side), Viewer B's image would show the virtual ball 908 traveling on a path 910, over the net 904 and bouncing on the virtual table 902 and traveling away from Viewer B and toward Viewer A. Simultaneously, the Viewer A's projection image on the screen 10 (not shown) would be the reverse of the image 900, i.e., it would show Viewer B hitting the virtual ball 908 from across the virtual table 902, and the virtual ball 908 traveling over the net 904 and bouncing on the table 902 toward Viewer A and away from Viewer B. Thus, for every action of each Viewer A,B, both projectors and both Talent Graphic Images would need to updated at substantially the same time.

Other examples of multi-person activities that may be used with the present disclosure include, but are not limited to, two viewers viewing opposite sides of a machine or item, such as the front and back of a robot, or doing an interview, where the interviewer and interviewee are on opposite sides of screen; acting where there are separate scripts for each person; games having different (exclusive or non-exclusive) views (such as guessing games, connection to other abstract strategy games, board games, or the like); video conferencing; teleprompting; or any other multi-person applications or uses where it is useful for each person to see different information (or a different view or perspective) associated with a common activity they are participating in or a common object or thing they are interacting with.

Figure 7:
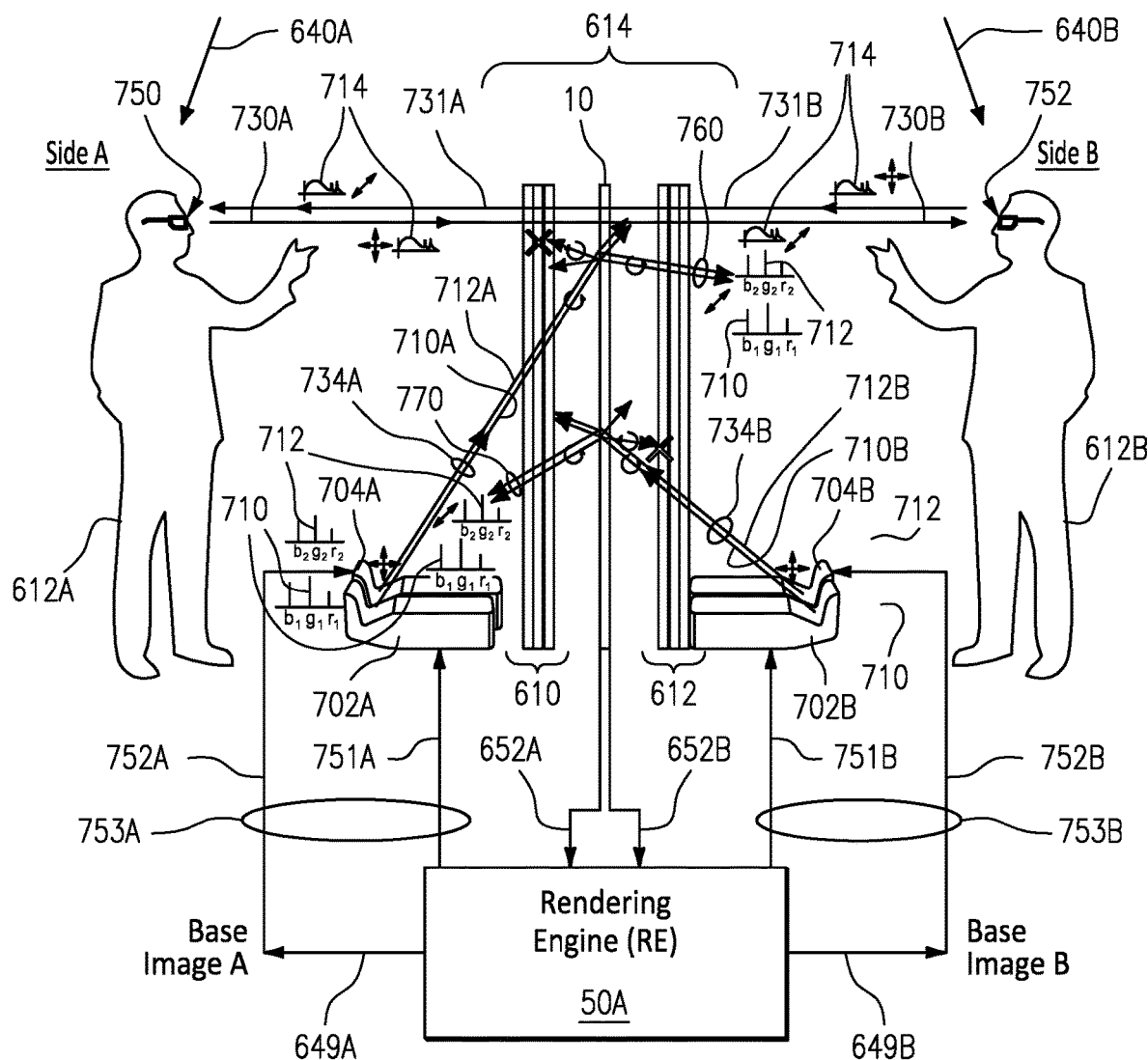
FIG. 7 is a block diagram of optical components of a two-sided 3D transparent display screen system, showing a side view of a screen and propagating light, in accordance with embodiments of the present disclosure.

Referring to FIG. 7, in some embodiments, "two-sided" (or multi-person) display screen using circular polarization (with reflection-cancellation), such as that shown in FIGS. 6A & 6B and 5C & 5D, may be used to provide three-dimensional (or 3D) imaging (using multiple color projection), as described below, also referred to as spectral comb filtering, or wavelength multiplex visualization, or super-anaglyph imaging technique.

In particular, the left and right projection images for Viewers A,B, respectively, may each be encoded with separate primary color wavelength sets (r1g1b1, r2g2b2) associate with a Viewer's left eye and right eye, respectively, and are projected onto the screen assembly 614 by the projectors 702A, 704A (for Viewer B image) and the projectors 702B, 704B (for Viewer A image), and the viewers 612A, 612B wear optical 3D-glasses 750, 752 (e.g., super-anaglyph 3D glasses). The projector 702A (similar to projector system 32 of FIGS. 4A and 4B having the projector 202A and the color filter 406 having r1g1b1) provides a color-encoded image 710A, encoded with r1g1b1 shown by graph 710, and the projector 704A (similar to projector system 32 of FIGS. 4A and 4B having the projector 202A and the color filter 406 having r2g2b2) provides a color-encoded image 712A, encoded with r2g2b2 shown by graph 712. The color-encoded images 710A, 712A collectively provide the projection image 634A (FIG. 6A) incident on the screen assembly 614. Similarly, the projector 702B provides a color-encoded image 710B, encoded with r1g1b1 shown by graph 710, and the projector 704B provides a color-encoded image 712B, encoded with r2g2b2 shown by graph 712. The color-encoded images 710B, 712B collectively provide the projection image 634B (FIG. 6A) incident on the screen assembly 614. The projection images 634A, 634B exhibit the same circular polarization gating effects (with reflection cancellation) described in FIGS. 6A and 6B, and provide a color-encoded projection image 760 (similar to the image 660 of FIG. 6A), viewed by Viewer B, and a color-encoded projection image 770 (similar to the image 660 of FIG. 6A), viewed by Viewer A. The color encoded optical signals are then color-decoded by each Viewer A,B using appropriate optical 3D-glasses 750, 752 (e.g., super-anaglyph glasses) worn by the Viewers A,B, respectively, so as to allow only the corresponding color coded image (or wavelengths) r1b1g1, r2b2g2, to pass to the corresponding left or right eye of the Viewer A,B, such that the Viewers A,B see the 3D the projected images or video in 3-Dimensions. Other types of stereoscopic 3D techniques, such as traditional "anaglyph" technique, where there is one color for each eye, such as left=red, right=cyan (blue-green)) or "active shutter" 3D, where lenses for each eye of the wearer are actively switched on and off, or other 3D techniques, may be used if desired, provided they provide the function and performance described herein.

Ambient or studio light 640A reflected from the Viewer A is randomly polarized (as described with FIG. 6A) and has a broad wavelength spectrum 714 (as described with FIG. 4A), and travels towards the Viewer B through the screen assembly 614 to become 45 degree linearly polarized with the broad wavelength spectrum 714, which is visible by the Viewer B as the image 730B. A similar effect occurs for ambient or studio light 640B reflected from the Viewer B which is randomly polarized (as described with FIG. 6A) and has a broad wavelength spectrum 714 (as described with FIG. 4A), and travels towards the Viewer A through the screen assembly 614 to become 45 degree linearly polarized with the broad wavelength spectrum 714, which is visible by the Viewer A as the image 731A. The 3D-glasses 750, 752 will not affect the ability of the Viewers A,B to see the broad wavelength spectrum images 731A, 730B, respectively.

Thus, the Viewer A can see the Viewer B through the projection screen assembly 416 and the Viewer A can also see the projected multi-color 3D image 734B projected by the projector 702B. Similarly, the Viewer B can see the Viewer A through the projection screen assembly 614 and Viewer B can also see the projected multi-color 3D image 734A projected by the projector 702A.

The two-sided rendering engine 50A for the two-sided 3D display system of FIG. 7 is similar to the two-sided rendering engine 50A for the two-sided two-dimensional (2D) display system shown in FIGS. 6A and 6B, except there are two projection signals (for two-color 3D effect) for each side of the screen 10. In particular, separate color-banded projection signals on lines 751A, 752A, collectively referred to as lines 753A, are provided to left side projectors 702A, 704A, to produce the color-banded optical projection images 710A, 712A, having the color bands (b1g1r1, b2g2r2), to be viewed by Viewer B, as discussed herein above. Similarly, separate color-banded projection signals on lines 751B, 752B, collectively referred to as lines 753B, are provided to the right side projectors 702B, 704B, to produce the color-banded optical projection images 710B, 712B, having the color bands (b1g1r1, b2g2r2), to be viewed by Viewer A, as discussed herein above. Accordingly, in that case, the two-sided rendering engine 50A processing logic 800 (FIG. 8), at block 806, would send the Viewer A Image as the color-banded projection signals to the right side projectors 702B, 704B on lines 751B, 752B, and, at block 810, would send the Viewer B Image as the color-banded projection signals to the left side projectors 702A, 704A on the lines 751A, 752A.

In some embodiments, the three-dimensional (or 3D) imaging (using multiple color projection), as described above with FIG. 7, may also be used for the one-sided display screen 10 such as that shown in FIGS. 1A-1C, 2A, 2B, 3A, 3B, 4A, 4B, and 5A-5D herein. In that case, the projector 202A would be replaced by two color-banded projectors (like the projectors 702A, 704A in FIG. 7). This would allow the talent 12 (while wearing the appropriate 3D glasses) to view the talent graphics GUI 30 in 3D, if desired. This may be useful in the case where the broadcast signal 70 (FIG. 1), is provided to the viewing audience in 3D (e.g., 3D graphic elements or images or videos).

In that case, the rendering engine 50 for a one-sided 3D display system would have two projection signals (for two-color 3D effect) for each side of the screen 10, similar to the separate color-banded projection signals on lines 751A, 752A (FIG. 7), provided to left side projectors 702A, 704A, to produce the color-banded optical projection images 710A, 712A, having the color bands (b1g1r1, b2g2r2), to be viewed by the talent 12, who would be wearing the 3D glasses, similar to Viewer B of FIG. 7, as discussed herein above.

As used herein, the polarizations and wavelengths of light of the images or optical signals described herein may each be referred to herein as an "optical property" of the light or associated image.

For any of the embodiments herein, either or both of the Viewers A,B may be replaced by respective video cameras or viewing devices and the content being viewed may be viewed by remote viewers, receiving a video feed or signals from the respective cameras, either in realtime, e.g., realtime online streaming over the internet or other network, or digitally stored for viewing at a later time (where appropriate or practical). Also, the term "viewer" as used herein may be used to collectively include people or individuals or video cameras or viewing devices, or the like that are viewing or watching something as described herein.

The system, computers, servers, devices and the like described herein have the necessary electronics, computer processing power, interfaces, memory, hardware, software, firmware, logic/state machines, databases, microprocessors, communication links (wired or wireless), displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general-purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, mobile communication devices, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, functions, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for providing selectively viewable images on a transparent display screen having a first surface facing both a first side of the screen and a first viewer and having an opposite second surface facing both a second side of the screen and a second viewer, comprising:
   projecting a first projection image having light with a first optical property onto the first surface of the screen, such that light having the first optical property passes through the screen and is viewable by the second viewer viewing from the second side of the screen, and such that there is a first reflected light which reflects off the first surface of the screen; and
   blocking the first reflected light of the first projection image such that the first projection image is not viewable by the first viewer viewing from the first side of the screen; and
   passing at least a portion of an illuminated second viewer image of the second viewer having light with other than the first optical property through the screen such that the portion of the illuminated second viewer image is visible through the screen by the first viewer viewing from the first side of the screen.

2. The method of claim 1, wherein the first viewer is a camera system comprising a video camera.

3. The method of claim 1, further comprising detecting a touch or gesture from the second viewer and providing an updated first projection image in response to such touch or gesture from the second viewer, the updated first projection image comprising an annotation graphic.

4. The system of claim 3, further comprising a broadcast image comprising the annotation graphic.

5. The method of claim 1, further comprising providing a broadcast image comprising the second viewer image and an overlay image comprising content indicative of at least a portion of the first projection image.

6. The method of claim 1, further comprising providing a broadcast image comprising the second viewer image, content indicative of at least a portion of the first projection image, and a base image.

7. The method of claim 1, wherein the first optical property of the first projection image comprises at least one of polarization and wavelength.

8. The method of claim 1, wherein the first optical property comprises a first polarization state of linear polarized light of the projection image.

9. The method of claim 1, wherein the first optical property comprises circularly polarized light of the projection image.

10. The method of claim 1, wherein the first projection image is viewable on the second side of the screen independent of the angle of projection of the first projection image.

11. The method of claim 1, wherein the first projection image comprises at least one of interactive content and interactive GUI visual tools.

12. The method of claim 11, wherein the interactive GUI visual tools comprises at least one of: video/image choices, tool bar options, colors options, video player buttons, and user/talent prompts.

13. The method of claim 1, wherein the second viewer comprises a presenter.

14. The method of claim 1, wherein the screen comprises a polarization-preserving screen.

15. The method of claim 1, wherein the screen comprises at least one of a holographic screen, a particle-embedded plastic screen, a pixelated display, a micro-LED display, and an OLED display.

16. The method of claim 1, wherein the projecting the first projection image is performed using a projector system comprising a long-throw projector or a short-throw projector.

17. The method of claim 1, further comprising:
projecting a second projection image having light with a second optical property onto the second surface of the screen, such that light having the second optical property passes through the screen and is viewable by the first viewer viewing from the first side of the screen, and such that there is a second reflected light which reflects off the first surface of the screen; and
blocking the second reflected light of the second projection image such that the second projection image is not visible by the second viewer viewing from the second side of the screen and such that at least a portion of an illuminated first viewer image of the first viewer having light with other than the second optical property passes through the screen and is visible through the screen by the second viewer viewing from the second side of the screen.

18. The method of claim 17, wherein the second optical property of the second projection image comprises at least one of polarization and wavelength.

19. The method of claim 17, wherein the projecting at least one of the first projection image and the second projection image, is done in 3D.

20. A system for providing selectively viewable images on a transparent display screen having a first surface facing a first side of the screen and an opposite second surface facing a second side of the screen, comprising:
a projector configured to project a first projection image onto the first side of the screen, the first projection image having light with a first optical property, such that there is a first reflected light which reflects off the first surface of the screen;
a camera disposed on the first side of the screen and arranged to view the screen from the first side of the screen; and
one or more optical components disposed between the projector and the screen and between the camera and the screen, the optical components configured to block the first reflected light of the first projection image such that the first projection image is not viewable by the camera, configured to pass the first projection image having light with the first optical property through the screen such that the first projection image is viewable by a second viewer viewing from the second side of the screen, and configured to pass at least a portion of an illuminated second viewer image of the second viewer having light with other than the first optical property, such that the second viewer image is viewable by the camera, through the screen.

21. The system of claim 20, further comprising a rendering engine configured to provide a digital content signal indicative of the first projection image, configured to receive the second viewer image from the camera, and configured to provide a broadcast image comprising the second viewer image and an overlay image comprising content indicative of at least a portion of the first projection image.

22. The system of claim 21, further comprising at least one sensor configured to detect a screen touch or gesture by the second viewer and wherein the rendering engine provides an updated digital content signal indicative of an updated first projection image in response to such touch or gesture from the second viewer, the updated first projection image comprising an annotation graphic.

23. The system of claim 22, wherein the broadcast image further comprises the annotation graphic.

24. The system of claim 20, wherein the optical components comprise at least one polarizer.

25. The system of claim 20, wherein the screen comprises a polarization-preserving screen.

26. The system of claim 20, wherein the screen comprises at least one of a holographic screen, a particle-embedded plastic screen, a pixelated display, a micro-LED display, and an OLED display.

27. The system of claim 20, wherein the first optical property of the first projection image comprises at least one of: polarization and wavelength.

28. The system of claim 20, wherein the first optical property comprises a first polarization state of linearly polarized light of the projection image.

29. The system of claim 20, wherein the first optical property comprises circularly polarized light of the projection image.

30. The system of claim 20, wherein the first projection image is viewable on the second side of the screen independent of the angle of projection of the first projection image.

31. The system of claim 20, wherein the first projection image comprises interactive content and interactive GUI visual tools.

32. The system of claim 31, wherein the interactive GUI visual tools comprises at least one of: video/image choices, tool bar options, colors options, video player buttons, and user/talent prompts.

33. The system of claim 20, wherein the projector is a long-throw projector or a short-throw projector.

34. The system of claim 20, wherein the optical components comprises an AR-coated circular polarizer disposed near or on the first surface of the screen.

35. The system of claim 34, wherein the circular polarizer is arranged to receive an unpolarized projector light from the projector and provides the first projection image having a first circular polarization which reflects off the screen and becomes the reflected light having a second circular polarization of opposite handedness to the first circular polarization and the reflected light is incident on and blocked by the circular polarizer.

36. A system for providing selectively viewable images on two sides of a transparent display screen having a first surface facing a first side of the screen and an opposite second surface facing a second side of the screen, the images being viewable by a first viewer viewing from the first side of the screen and being viewable by a second viewer viewing from the second side of the screen, comprising:
a first projector configured to project a first projection image onto the first side of the screen, the first projection image having light with a first optical property, such that there is a first reflected light which reflects off the first surface of the screen;
one or more first optical components disposed between with the projector and the screen and between the first viewer and the screen the optical components configured to block the first reflected light of the first projection image such that the first projection image is not visible by the first viewer, configured to pass the first projection image having light with the first optical property through the screen such that the first projection image is viewable by the second viewer, and configured to pass at least a portion of an illuminated second viewer image of the second viewer having light with other than the first optical property, through the screen, such that the second viewer image is viewable by the first viewer;

a second projector configured to project a second projection image onto the second side of the screen, the second projection image having a second optical property, such that there is a second reflected light which reflects off the second surface of the screen; and one or more second optical components disposed between with the second projector and the screen and between the second viewer and the screen, the optical components configured to block the second reflected light of the second projection image such that the second projection image is not visible by the second viewer, configured to pass the first projection image having light with the second optical property through the screen to the first side of the screen such that the second projection image is viewable by the first viewer, and configured to pass at least a portion of an illuminated first viewer image of the first viewer having light with other than the first optical property, through the screen, such that the first viewer image is viewable by the second viewer.

37. The system of claim 36, further comprising a rendering engine configured to provide a first digital content signal indicative of the first projection image to the first projector and a second digital content signal indicative of the second projection image to the second projector.

38. The system of claim 36, wherein the first projection image is viewable from the second side of the screen independent of the angle of projection of the first projection image and wherein the second projection image is viewable from the first side of the screen independent of the angle of projection of the second projection image.

39. The system of claim 36, wherein the first optical property of the first projection image comprises at least one of polarization and wavelength, and wherein the second optical property of the second projection image comprises at least one of polarization and wavelength.

* * * * *